United States Patent
Kim et al.

(10) Patent No.: US 8,164,730 B2
(45) Date of Patent: Apr. 24, 2012

(54) LIQUID CRYSTAL DISPLAY

(75) Inventors: Dong-Gyu Kim, Yongin-si (KR); Hee-Joon Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 942 days.

(21) Appl. No.: 11/511,032

(22) Filed: Aug. 28, 2006

(65) Prior Publication Data
US 2007/0052897 A1    Mar. 8, 2007

(30) Foreign Application Priority Data
Sep. 7, 2005  (KR) .................. 10-2005-0083265

(51) Int. Cl.
*G02F 1/1343*  (2006.01)
*G02F 1/136*  (2006.01)

(52) U.S. Cl. .......... 349/146; 349/48; 349/143; 349/144; 349/145

(58) Field of Classification Search .......... 349/129, 349/139, 48, 143, 146, 144–145
See application file for complete search history.

(56) References Cited

U.S. PATENT DOCUMENTS

| 6,583,837 | B1* | 6/2003 | Fukumoto et al. | 349/129 |
| 2003/0227429 | A1 | 12/2003 | Shimoshikiryo | |
| 2004/0070713 | A1* | 4/2004 | Song | 349/129 |
| 2004/0135147 | A1 | 7/2004 | Kim et al. | |
| 2004/0227889 | A1 | 11/2004 | Kim | |
| 2005/0036091 | A1* | 2/2005 | Song | 349/129 |
| 2005/0078263 | A1* | 4/2005 | Kim et al. | 349/144 |
| 2005/0094082 | A1* | 5/2005 | Kim et al. | 349/145 |

FOREIGN PATENT DOCUMENTS

| EP | 0685756 | A2 | 12/1995 |
| EP | 1674922 | A1 | 6/2006 |
| JP | 09-269509 | | 10/1997 |
| KR | 1020040062752 | | 7/2004 |
| KR | 1020050028703 | | 3/2005 |

* cited by examiner

*Primary Examiner* — Brian M. Healy
*Assistant Examiner* — Charles Chang
(74) *Attorney, Agent, or Firm* — F. Chau & Associates, LLC

(57) ABSTRACT

A liquid crystal display includes a substrate and a plurality of pixel electrodes that are formed on the substrate, each of the pixel electrodes including first and second subpixel electrodes, wherein the first and second subpixel electrodes are adjacently disposed in a lateral direction. Each of the first and second subpixel electrodes includes at least two parallelogram shaped electrode pieces having different inclination directions and at least one of electrode pieces of the second subpixel electrode is positioned on or under the first subpixel electrode.

43 Claims, 19 Drawing Sheets

LIQUID CRYSTAL DISPLAY

CROSS-REFERENCE TO RELATED PATENT APPLICATION

This application claims priority to Korean Patent Application No. 10-2005-0083265, filed in the Korean Intellectual Property Office, on Sep. 7, 2005, the disclosure of which is incorporated by reference herein in its entirety.

BACKGROUND OF THE INVENTION (a) Technical Field

The present disclosure relates to a liquid crystal display.

(b) Discussion of the Related Art

A liquid crystal display includes two display panels provided with field generating electrodes and a liquid crystal layer disposed between the two panels. The field generating electrodes may include a plurality of pixel electrodes and a common electrode. Voltages are applied to the field generating electrodes to generate an electric field in the liquid crystal layer. The electric field determines the orientation of liquid crystal molecules of the liquid crystal layer. These molecular orientations in turn determine the transmittance of light passing through the liquid crystal layer, thereby displaying an image by controlling polarization of incident light.

The liquid crystal display also includes a switching element that is connected to each pixel electrode and a plurality of signal lines which include gate and data lines. A voltage may be applied to each pixel electrode through the gate and data lines by controlling the switching element.

A liquid crystal display with a vertically aligned mode has a long axis of liquid crystal molecules arranged perpendicular to a vertical display panel. When an electric field is not applied, the liquid crystal display has a large contrast ratio and a wide reference viewing angle. An example of a wide reference viewing angle is a viewing angle in which a contrast ratio is 1:10.

A wide viewing angle in a liquid crystal display with a vertical alignment mode may be produced by forming a cutout and a protrusion on a field generating electrode.

Since an inclination direction of a liquid crystal molecule can be determined by a cutout and a protrusion, a reference viewing angle can be enlarged by distributing an inclination direction of the liquid crystal molecule in several directions when the cutouts and/or protrusions are used.

Side visibility is improved by a method of adjusting transmittance by changing a voltage of two subpixels by directly applying a voltage to one subpixel and dropping a voltage through capacitive coupling in the other subpixel after dividing one pixel into two subpixels and coupling two subpixels through capacitive coupling.

However, in this method, transmittance of the two subpixels cannot be accurately adjusted to a desired level, and light transmittance changes depending on a particular color. Further, the aperture ratio deteriorates due to the addition of a conductor for capacitive coupling, and transmittance decreases due to a voltage drop by the capacitive coupling. Moreover, because it is difficult to transmit light in a part with a protrusion or a cutout, the aperture ratio deteriorates further as the number of protrusions or cutouts increases.

It has been suggested that aperture ratio may be increased by use of an ultra-high aperture ratio structure that enlarges a pixel electrode. However, a strong lateral field is generated around the edge of a pixel electrode because a distance between pixel electrodes is short and a distance between a pixel electrode and a data line is also short. Alignment of liquid crystal molecules is distributed due to such a lateral field, whereby texture or light leakage is generated and response time is delayed.

Furthermore, a liquid crystal display with a vertically aligned mode has lower side visibility than front visibility. For example, in a liquid crystal display of a PVA (patterned vertically aligned) mode with a cutout, an image becomes bright towards the side, and in a serious case, a picture distorted because there is no luminance difference between high grays.

There is a need for a liquid crystal display with improved transmittance, aperture ratio, and side visibility.

SUMMARY OF THE INVENTION

An exemplary embodiment of the present invention provides a liquid crystal display including a substrate and a plurality of pixel electrodes formed on the substrate and that include first and second subpixel electrodes, wherein the first and second subpixel electrodes are adjacently disposed in a lateral direction, each of the first and second subpixel electrodes include at least two parallelogram shaped electrode pieces having different inclination directions, and at least one of electrode pieces of the second subpixel electrode is positioned on or under the first subpixel electrode.

According to an exemplary embodiment of the present invention, the first subpixel electrode may include one right-inclination parallelogram electrode piece and one left-inclination parallelogram electrode piece, and the second subpixel electrode may include three right-inclination parallelogram electrode pieces and three left-inclination parallelogram electrode pieces.

A right-inclination parallelogram electrode piece and a left-inclination parallelogram electrode piece may be paired, and these pairs may be alternately arranged in a vertical direction.

A height of the electrode piece of the first subpixel electrode may be between about 1 to about 2.5 times that of the electrode piece that is positioned on or under the first subpixel electrode among the electrode pieces of the second subpixel electrode.

An exemplary embodiment of the present invention provides a liquid crystal display including a substrate and a plurality of pixel electrodes formed on the substrate and that include first and second subpixel electrodes, wherein the first and second subpixel electrodes are adjacently disposed in a lateral direction, each of the first and second subpixel electrodes includes at least two parallelogram electrode pieces having different inclination directions, the parallelogram electrode pieces having different inclination directions are alternately arranged in a vertical direction, and the number of electrode pieces of the second subpixel electrode is larger than that of the electrode pieces of the first subpixel electrode.

According to an exemplary embodiment of the present invention, the first subpixel electrode may include one right-inclination parallelogram electrode piece and one left-inclination parallelogram electrode piece, and the second subpixel electrode may include two right-inclination parallelogram electrode pieces and two left-inclination parallelogram electrode pieces.

According to an exemplary embodiment of the present invention, a transverse center line of the first subpixel electrode and a transverse center line of the second subpixel electrode may be disposed in a straight line.

Two of the pixel electrodes that are adjacently disposed in a vertical direction may be in bilateral inversion symmetry, and two of the pixel electrodes that are adjacently disposed in a lateral direction may have the same shape and their transverse center lines may be disposed in substantially the same straight line.

Two of the pixel electrodes that are adjacently disposed in a vertical direction may be in bilateral inversion symmetry, pixel electrodes that are adjacently disposed in a lateral direction may have unmatched transverse center lines, and each of the first and second subpixel electrodes of the pixel electrodes that are adjacently disposed in a lateral direction may be in bilateral inversion symmetry.

A height of the electrode piece of the first subpixel electrode and that of an electrode piece of the second subpixel electrode may be substantially the same.

An area of the second subpixel electrode may be about 1.1 to about 3 times that of the first subpixel electrode.

The liquid crystal display may further include a common electrode that is opposite to the pixel electrode and that has a cutout, wherein each of the electrode pieces may include a pair of oblique edges that are parallel to each other, and the cutout may include an oblique portion that crosses the first and second subpixel electrodes and that is parallel to an oblique edge of an electrode pieces.

Voltages of the first subpixel electrode and the second subpixel electrode may be different from each other.

The liquid crystal display may further include a first thin film transistor that is connected to the first subpixel electrode, a second thin film transistor that is connected to the second subpixel electrode, a first signal line that is connected to the first thin film transistor, a second signal line that is connected to the second thin film transistor, and a third signal line that is connected to the first and second thin film transistors and that intersects the first and second signal lines.

The first and second thin film transistors may be turned on depending on a signal from the first and second signal lines, respectively, to transfer a signal from the third signal line.

The first and second thin film transistors may be turned on depending on a signal from the third signal line, to respectively transfer a signal from the first and second signal lines.

The liquid crystal display may further include an organic layer that is formed between the first and second thin film transistors and the pixel electrodes.

When at least one signal line that transfers a data signal among the first to third signal lines is a data line, an area in which the data line is overlapped with the first subpixel electrode of a first one of the pixel electrodes with the organic layer interposed therebetween and an area in which the data line is overlapped with a second subpixel electrode of a second one of the pixel electrodes being adjacent to the first one of the pixel electrodes may be substantially equal to each other.

The first subpixel electrode and the second subpixel electrode may be coupled to each other through capacitive coupling.

The liquid crystal display may further include a thin film transistor that is connected to the first subpixel electrode, a data line that is connected to the thin film transistor, and an organic layer that is formed between the thin film transistor and the pixel electrode.

An area in which the data line is overlapped with the first subpixel electrode of the a first one of the pixel electrodes with the organic layer interposed therebetween and an area in which the data line is overlapped with a second subpixel electrode of a second one of the pixel electrodes being adjacent to the pixel electrode may be substantially equal to each other.

An exemplary embodiment of the present invention provides a liquid crystal display including a substrate and a pixel electrode formed on the substrate and that includes a first and second subpixel electrodes, wherein the subpixel electrodes are adjacently disposed in a lateral direction and have first regions and second regions of the same form, each of the first and second subpixel electrodes includes at least two parallelogram electrode pieces having different inclination directions, the first subpixel electrode is positioned in the first region, and the second subpixel electrode includes a first electrode piece that is positioned in the first region and a second electrode piece that is positioned in the second region.

The first subpixel electrode may include one right-inclination parallelogram electrode piece and one left-inclination parallelogram electrode piece, and each of the first and second electrode pieces may include one right-inclination parallelogram electrode piece and one left-inclination parallelogram electrode piece.

The first subpixel electrode may include one right-inclination parallelogram electrode piece and one left-inclination parallelogram electrode piece, the first electrode piece may include one right-inclination parallelogram electrode piece and one left-inclination parallelogram electrode piece, and the second electrode piece may include two right-inclination parallelogram electrode pieces and two left-inclination parallelogram electrode pieces.

A height of the first subpixel electrode may be about 1 to about 2.5 times that of the first electrode piece.

A exemplary embodiment of the present invention provides a liquid crystal display including a substrate and a pixel electrode formed on the substrate and that includes first and second subpixel electrodes, wherein the first and second subpixel electrodes are adjacently disposed in a lateral direction, the first subpixel electrode has a pair of first curved edges that are parallel to each other, the second subpixel electrode has a pair of second curved edges that are parallel to each other, and the number of the second curved edges is larger than that of the first curved edges.

The number of the first curved edges may be one, and the number of second curved edges is three.

An area of the second subpixel electrode may be about 1.1 to about 3 times that of the first subpixel electrode.

BRIEF DESCRIPTION OF THE DRAWINGS

The embodiments of the present invention will become more apparent by describing in detail exemplary embodiments thereof with reference to the attached drawings, in which.

DETAILED DESCRIPTION OF EXEMPLARY EMBODIMENTS

Figure 1:
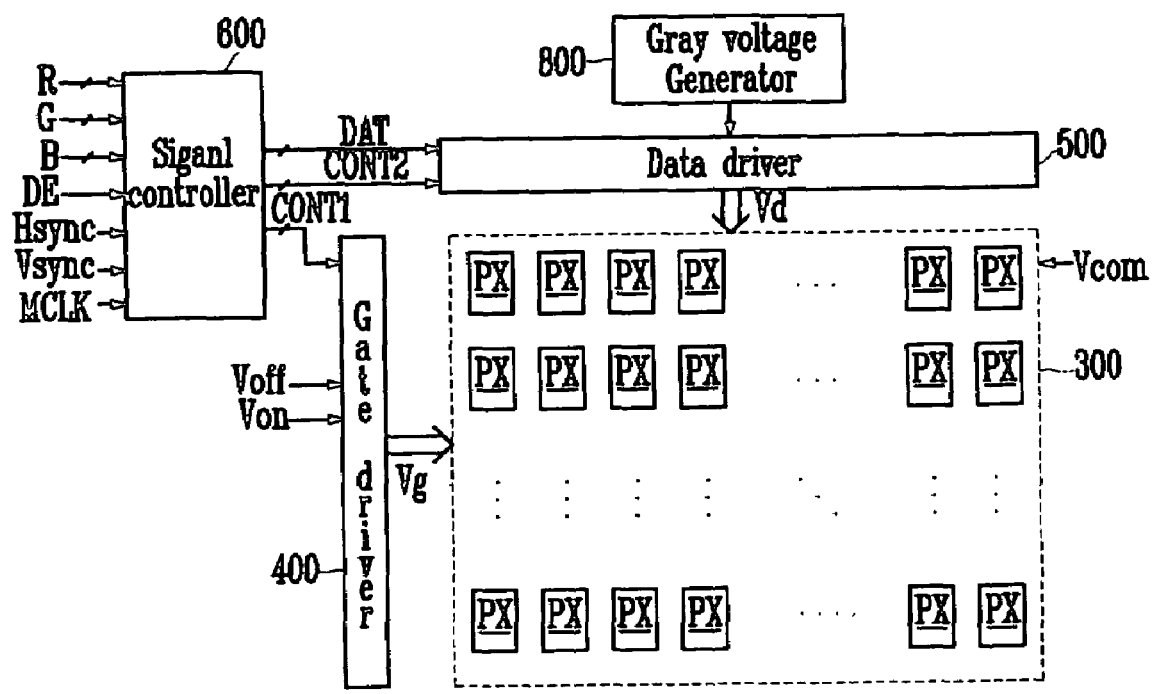
FIG. 1 is a block diagram of a liquid crystal display according to an exemplary embodiment of the present invention.

Hereinafter, exemplary embodiments of the present invention will be described in detail with reference to the accompanying drawings. This invention may, however, be embodied in many different forms and should not be construed as limited to the embodiments set forth herein. In the drawings, the thickness of layers, films, panels, regions, etc., are exaggerated for clarity. Like reference numerals designate like elements throughout the specification.

A liquid crystal display according to an exemplary embodiment of the present invention will be described in detail with reference to FIGS. 1 and 2.

Figure 2:
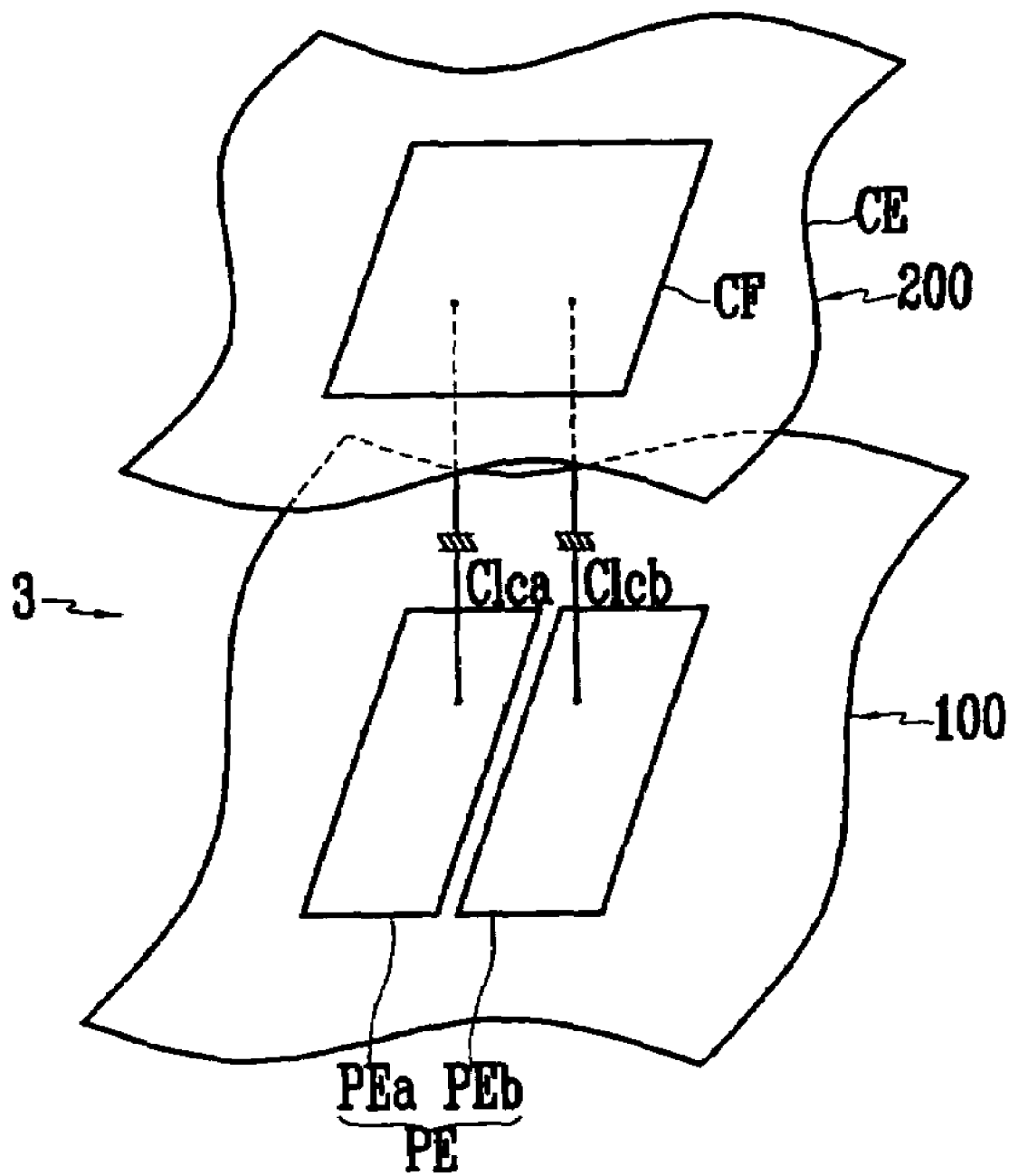
FIG. 2 is an equivalent circuit diagram of two subpixels of a liquid crystal display according to an exemplary embodiment of the present invention.

FIG. 1 is a block diagram of a liquid crystal display according to an exemplary embodiment of the present invention, and FIG. 2 is an equivalent circuit diagram of two subpixels of a liquid crystal display according to an exemplary embodiment of the present invention.

As shown in FIG. 1, the liquid crystal display includes a liquid crystal panel assembly 300, a gate driver 400 and a data driver 500 that are connected thereto, a gray voltage generator 800 that is connected to the data driver 500, and a signal controller 600 that controls them.

The liquid crystal panel assembly 300 includes a plurality of signal lines (not shown) and a plurality of pixels PX that are connected thereto and arranged in approximately a matrix.

As shown in FIG. 2, the liquid crystal panel assembly 300 includes lower and upper panels 100 and 200 that are opposite each other, and a liquid crystal layer 3 that is disposed therebetween.

The signal lines include a plurality of gate lines (not shown) that transfer gate signals (scanning signals) and a plurality of data lines (not shown) that transfer data signals.

The gate lines extend in approximately a row direction and are almost parallel to each other, and the data lines extend in approximately a column direction and are almost parallel to each other.

Each pixel PX includes a pair of subpixels, and each subpixel includes liquid crystal capacitors Clca and Clcb. At least one of two subpixels includes a switching element (not shown) that is connected to the gate line, the data line, and the liquid crystal capacitors Clca and Clcb.

The liquid crystal capacitors Clca and Clcb have subpixel electrodes PEa and PEb on the lower panel 100 and a common electrode CE on the upper panel 200 as two terminals, and the liquid crystal layer 3 between the subpixel electrodes PEa and PEb and the common electrode CE functions as a dielectric material. A pair of subpixel electrodes PEa and PEb are separated from each other and constitute one pixel electrode PE. The common electrode CE is formed on an entire surface of the upper panel 200 and receives a common voltage Vcom.

The liquid crystal layer 3 has a negative dielectric anisotropy, and liquid crystal molecules of the liquid crystal layer 3 may be aligned so that long axes thereof are perpendicular to a surface of the two display panels when there is no electric field.

A color display is represented by allowing each pixel PX to inherently display one of the primary colors (spatial division) or to sequentially display the primary colors (temporal division). A desired color is determined by the spatial or temporal sum of the primary colors. An example of a set of the primary colors includes red, green, and blue.

FIG. 2 shows as an example of spatial division in which each pixel PX is provided with a color filter CF for displaying one of the primary colors in a region of the upper panel 200. Although not illustrated in FIG. 2, the color filter CF may be formed on or under the subpixel electrodes PEa and PEb of the lower panel 100.

A polarizer (not shown) is provided in the outer surface of each of the display panels 100 and 200. Polarization axes of each polarizers may be orthogonal. In a reflective liquid crystal display, one of the two polarizers is optional. An orthogonal polarizer blocks incident light entering the liquid crystal layer 3 where there is no electric field.

A pixel electrode, a common electrode, and a color filter of a liquid crystal panel assembly will be described with reference to FIGS. 3A, 3B, 4, 5, 6A, 6B, 7A, and 7B.

Figure 3A:
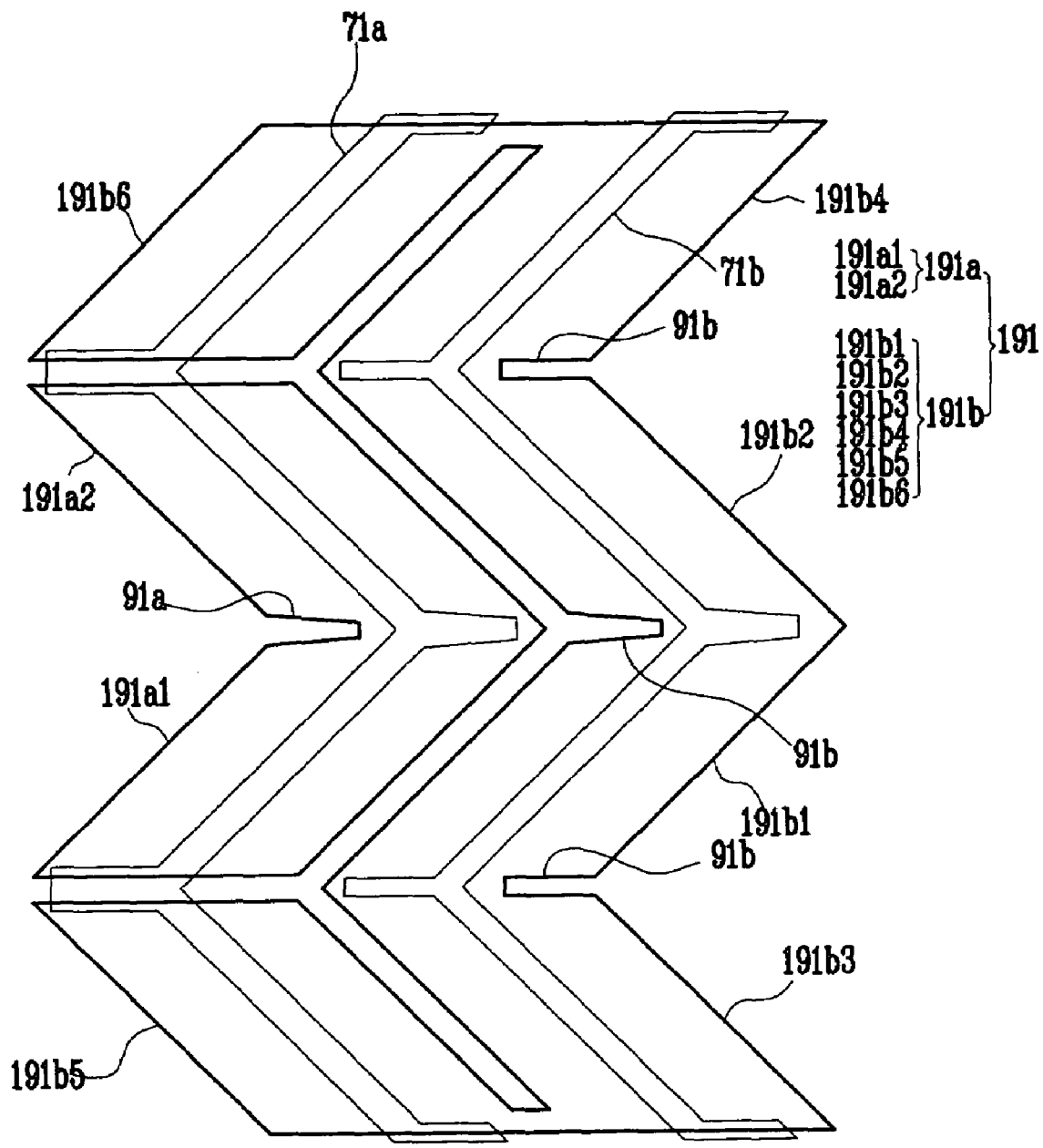
FIGS. 3A to 5 are layout views of a pixel electrode and a common electrode in a liquid crystal panel assembly according to exemplary embodiments of the present invention.
Figure 3B:
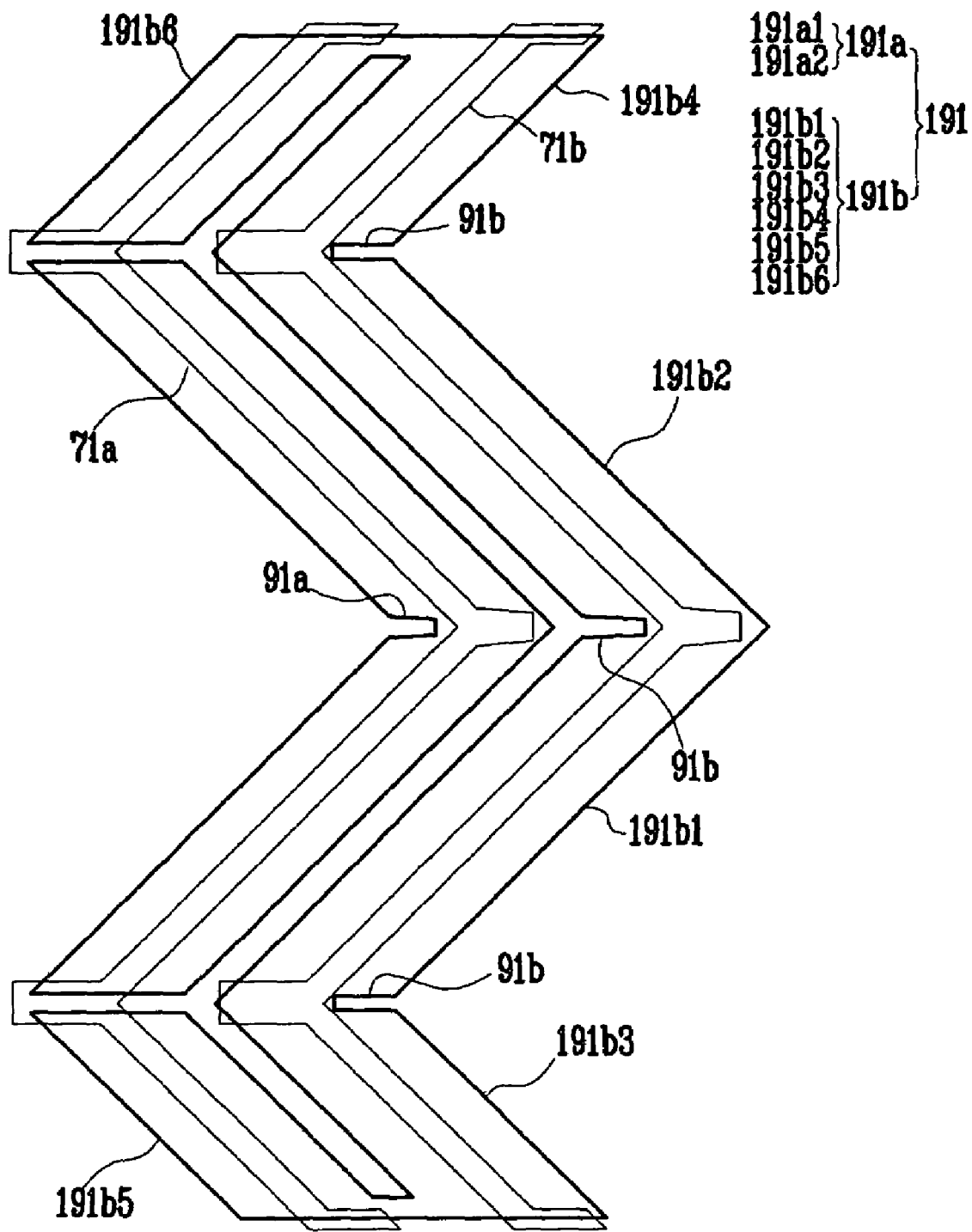
Figure 4:
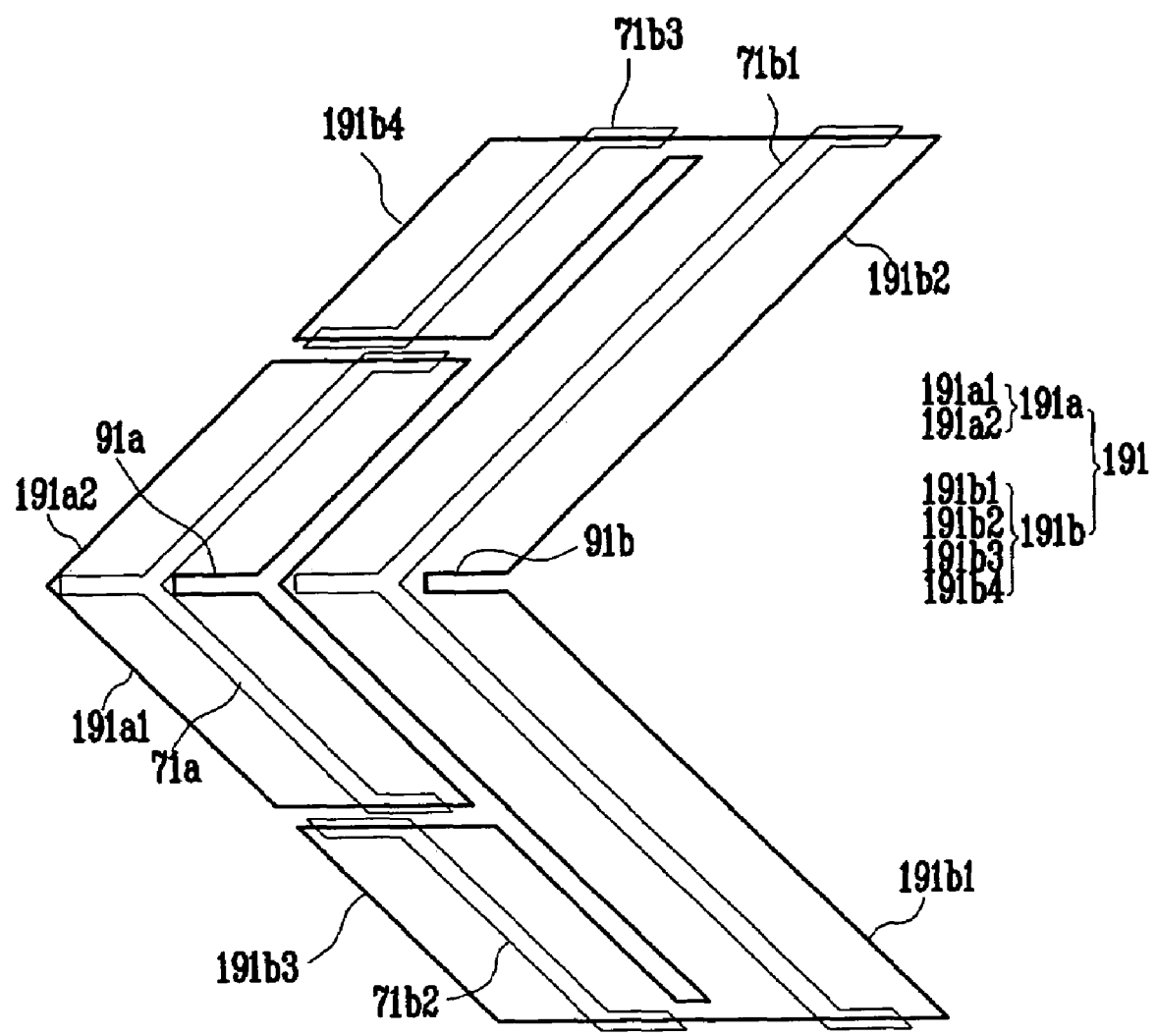
Figure 5:
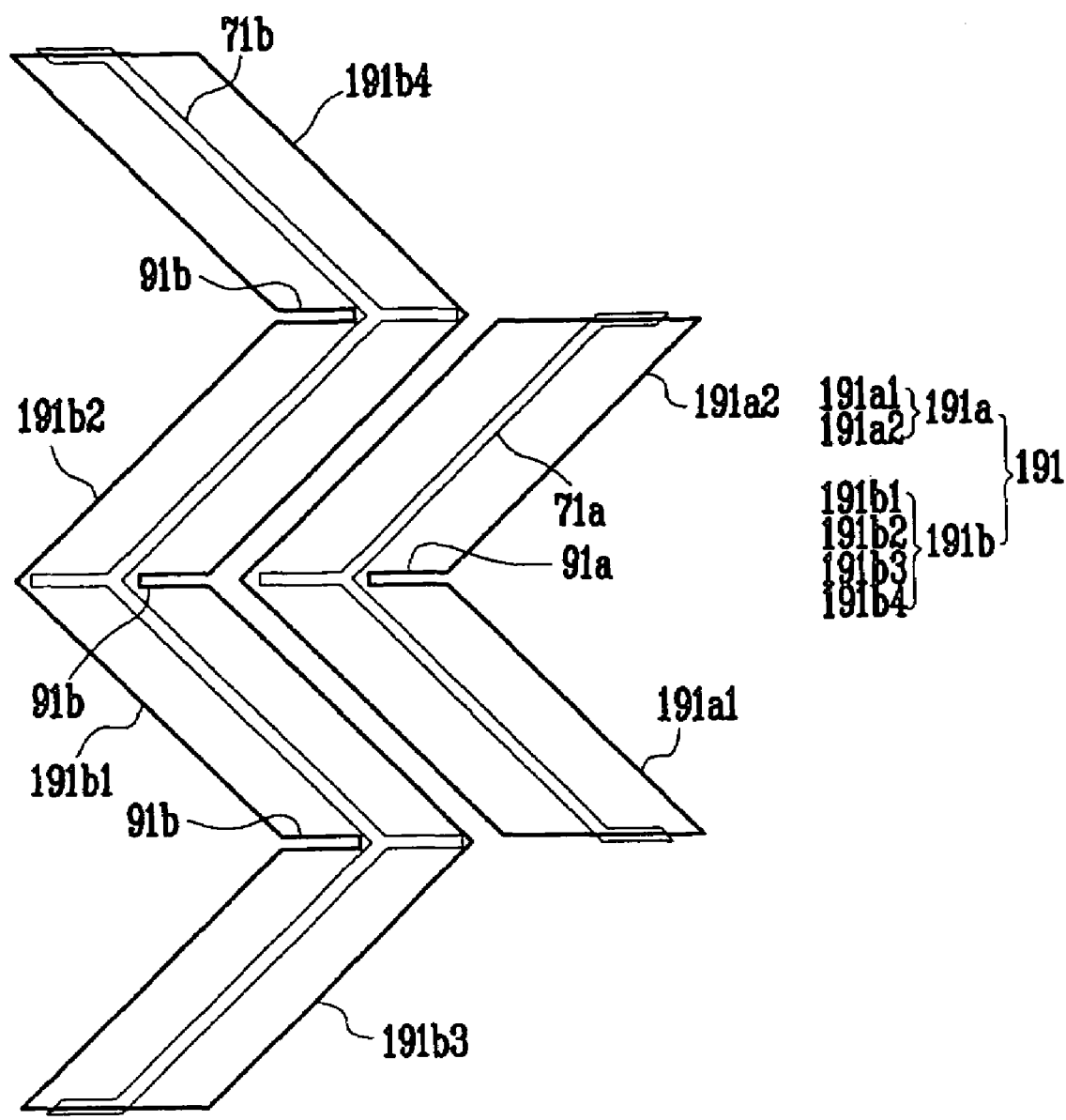
Figure 6A:
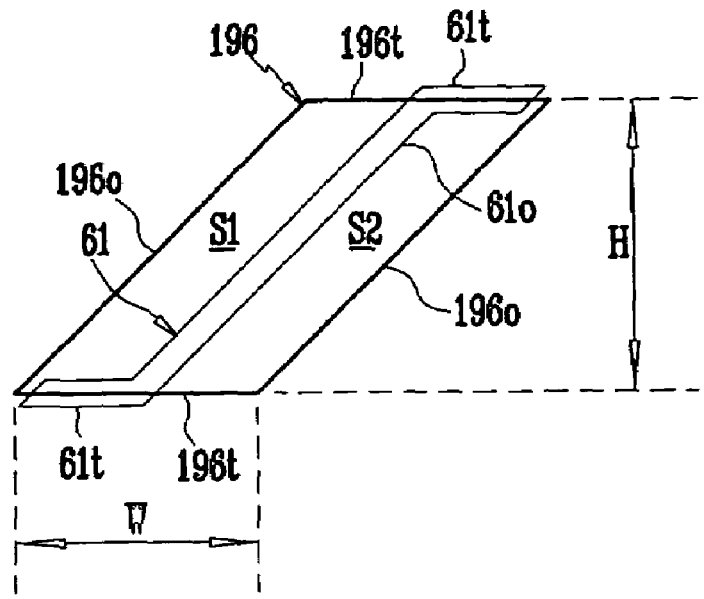
FIGS. 6A to 6C are top plan views of a basic electrode piece of each subpixel electrode shown in FIGS. 3A to 5.
Figure 6B:
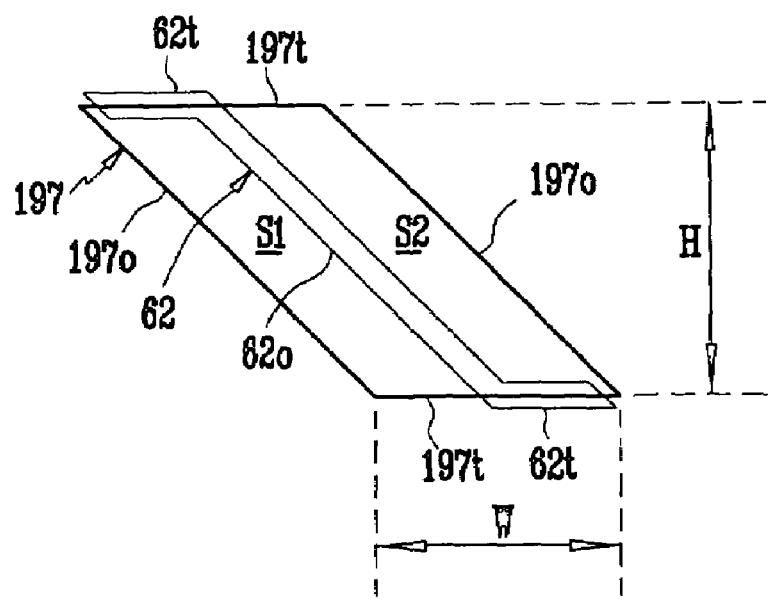
Figure 6C:
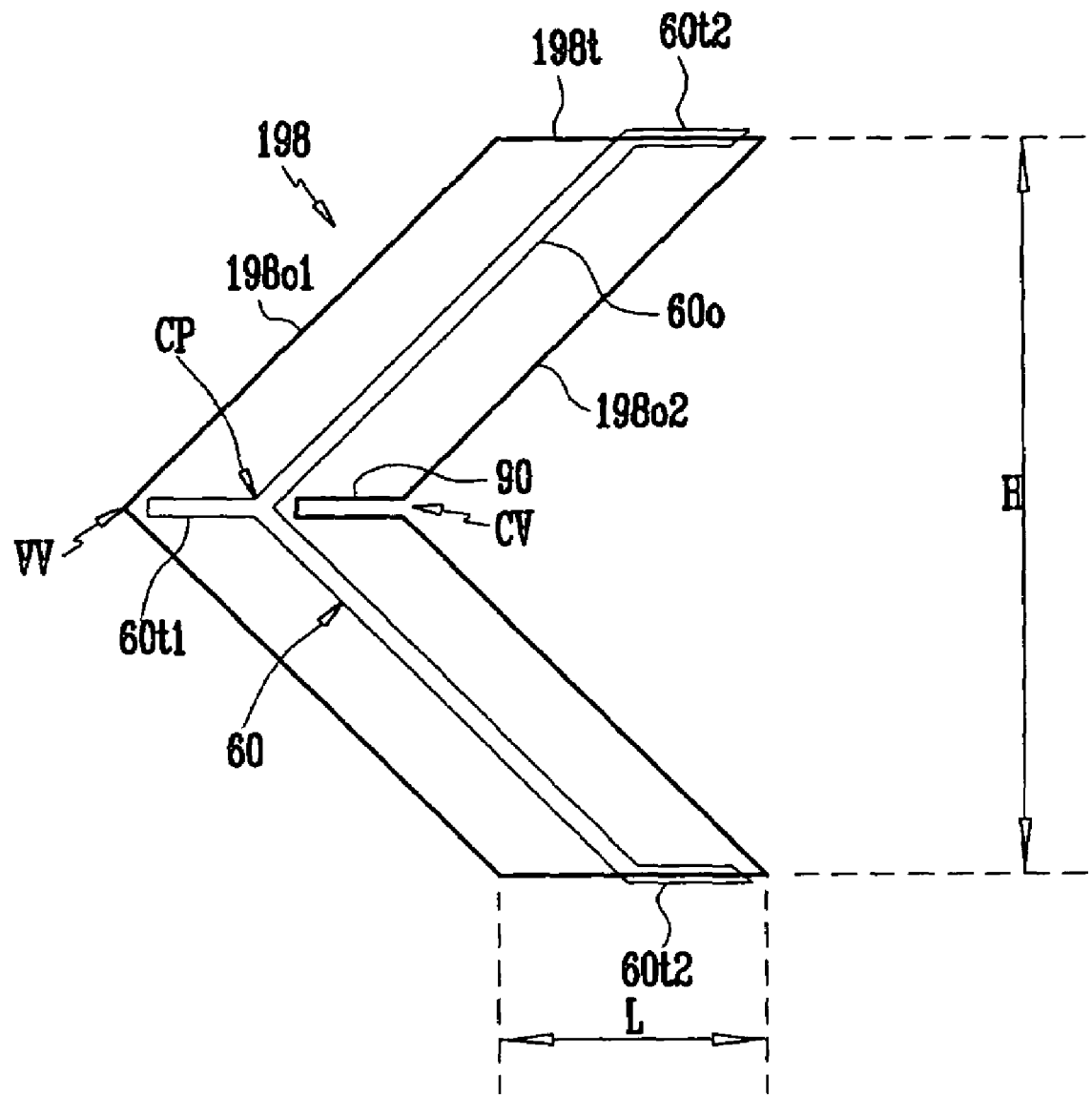

FIGS. 3A to 5 are layout views of a pixel electrode and a common electrode in a liquid crystal panel assembly according to exemplary embodiments of the present invention, FIGS. 6A to 6C are top plan views of a basic electrode piece of each subpixel electrode shown in FIGS. 3A to 5, and FIGS. 7A and 7B are schematic layout views of a liquid crystal panel assembly including a plurality of pixel electrodes shown in FIG. 5.

As shown in FIGS. 3A to 5, each pixel electrode 191 includes a pair of first and second subpixel electrodes 191a and 191b that are separated from each other.

A first subpixel electrode 191a and a second subpixel electrode 191b are adjacently disposed in a row direction and have cutouts 91a and 91b, respectively.

The common electrode 270 (see FIG. 2) has cutouts 71a, 71b, 71b1, 71b2, and 71b3 that are opposite to the first and second subpixel electrodes 191a and 191b.

The first subpixel electrode 191a and the second subpixel electrode 191b constituting one pixel electrode 191, may be connected to different switching elements (not shown).

Alternatively, the first subpixel electrode 191a may be connected to a switching element (not shown) and the second subpixel electrode 191b may be coupled to the first subpixel electrode 191a through capacitive coupling.

Each of the first and second subpixel electrodes 191a and 191b includes at least one parallelogram electrode piece 196 shown in FIG. 6A and at least one parallelogram electrode piece 197 shown in FIG. 6B.

When the electrode pieces 196 and 197 shown in FIGS. 6A and 6B are vertically connected, they become a basic electrode 198 shown in FIG. 6C. Each of the subpixel electrodes 191a and 191b forms part of the basic electrode 198.

As shown in FIGS. 6A and 6B, each of the electrode pieces 196 and 197 has a pair of oblique edges 196o and 197o and a pair of transverse edges 196t and 197t, and has a parallelogram shape. Each of the oblique edges 196o and 197o forms an oblique angle to the transverse edges 196t and 197t, and a size of the oblique angle may be about 45° to 135°.

It is called "right inclination" when oblique edges are inclined to the right side as in FIG. 6A, and it is called "left inclination" when the oblique edges are inclined to the left side as in FIG. 6B.

In electrode pieces 196 and 197, a length of the transverse edges 196t and 197t, i.e., a width W, and a distance between the transverse edges 196t and 197t, i.e., a height H, may be freely determined depending on a size of the display panel assembly 300.

Furthermore, in each of the electrodes 196 and 197, the transverse edges 196t and 197t may be formed in the shape of a parallelogram by being curved or protruded considering the relationship with other parts.

The cutouts 61 and 62 facing the electrode pieces 196 and 197 are formed in the common electrode 270, and the electrode pieces 196 and 197 are divided into two subregions S1 and S2 about the cutouts 61 and 62.

The cutouts 61 and 62 include oblique portions 61o and 62o in parallel to the oblique edges 196o and 197o of the electrode pieces 196 and 197, and transverse portions 61t and 62t that overlap with the transverse edges 196t and 197t of the electrode pieces 196 and 197 while forming an obtuse angle with the oblique portions 61o and 62o.

Each of the subregions S1 and S2 has two primary edges that are defined by the oblique portions 61o and 62o of the cutouts 61 and 62 and the oblique edges 196o and 197o of the electrode pieces 196 and 197. A distance between primary edges, i.e., a width of a subregion, may be about 25 to 40 cm.

A basic electrode 198 shown in FIG. 6C is formed by coupling of the right-inclination electrode piece 196 and the left-inclination electrode piece 197.

An angle at which the right-inclination electrode piece 196 and the left-inclination electrode piece 197 are formed may be approximately a right angle, and the two electrode pieces 196 and 197 may be partly connected. Non-connected portions constitute a cutout 90, and are positioned in a concave side. However, the cutout 90 is optional.

The outside transverse edges 196t and 197t of electrode pieces 196 and 197 constitute the transverse edge 198t of the basic electrode 198, and the corresponding oblique edges 196o and 197o of electrode pieces 196 and 197 are connected to each other to form curved edges 198o1 and 198o2 of the basic electrode 198.

The curved edges 198o1 and 198o2 include a convex edge 198o1 that meets with an obtuse angle, for example about 135° with the transverse edge 198t, and a concave edge 198o2 that meets with an acute angle, for example about 45° with the transverse edge 198t.

The curved edges 198o1 and 198o2 are formed as a pair of oblique edges 196o and 197o and meet with approximately a right angle, and a curved angle thereof is approximately a right angle.

The cutout 60 may extend to approximately the center of the basic electrode 198 toward a convex summit VV on the convex edge 198o1 from a concave summit CV on the concave edge 198o2. Furthermore, the cutouts 61 and 62 of the common electrode 270 are connected to each other to form the cutout 60. Transverse portions 61t and 62t that overlap in the cutouts 61 and 62 are added to constitute one transverse portion 60t1.

The cutout 60 includes a curved portion 60o that has a curved point CP, a central transverse portion 60t1 that is connected to the curved point CP of the curved portion 60o, and a pair of vertical transverse portions 60t2 that are connected to both ends of the curved portion 60o.

The curved portion 60o of the cutout 60 includes a pair of oblique portions that meet with a right angle, is almost parallel to the curved edges 198o1 and 198o2 of the basic electrode 198, and divides the basic electrode 198 into a left half and a right half.

The central transverse portion 60t1 of the cutout 60 forms an obtuse angle, for example about 135° with the curved portion 60o, and extends toward a convex summit VV of the basic electrode 198.

The vertical transverse portion 60t2 is aligned with the transverse edge 198t of the basic electrode 198 and forms an obtuse angle, for example about 135° with the curved portion 60o.

The basic electrode 198 and the cutout 60 are in an approximate inversion symmetry about an imaginary straight line (hereinafter, referred to as a "transverse center line") connecting the convex summit VV and the concave summit CV of the basic electrode 198.

In each pixel electrode 191 shown in FIGS. 3A to 5, a size of the first subpixel electrode 191a is smaller than that of the second subpixel electrode 191b.

Particularly, a height of the second subpixel electrode 191b is larger than that of the first subpixel electrode 191a, and widths of subpixel electrodes 191a and 191b are substantially equal.

The number of electrode pieces of the second subpixel electrode 191b is larger than that of the electrode pieces of the first subpixel electrode 191a.

The first subpixel electrode 191a includes a left-inclination electrode piece 197 and a right-inclination electrode piece 196, and has substantially the same structure as a basic electrode 198 shown in FIG. 6C.

The second subpixel electrode 191b includes the combination of at least two left-inclination electrode pieces 197, at least two right-inclination electrode pieces 196, the basic electrode 198 shown in FIG. 6C, and the left and right inclination electrode pieces 196 and 197 that are coupled thereto.

The second subpixel electrode 191b shown in FIGS. 3A and 3B includes six electrode pieces 191b1 to 191b6, and two electrode pieces 191b5 and 191b6 among them are disposed in an upper part and a lower part of the first subpixel electrode 191a.

An aperture ratio is increased as a transverse portion is formed by adding the transverse portions 61t and 62t of the cutouts 61 and 62 of the common electrode 270 to a place adjacent to electrode pieces 191a1 and 191a2 of the first subpixel electrode 191a and electrode pieces 191b5 and 191b6 of the second subpixel electrode 191b.

In a structure shown in FIG. 3A, a height of electrode pieces 191a1, 191a2, 191b1, and 191b2 that are disposed in the middle of the structure and that of electrode pieces 191b3 to 191b6 that are disposed in the upper and lower part of the structure are substantially the same, but in a structure shown in FIG. 3B, a height of the middle electrode pieces 191a1, 191a2, 191b1, and 191b2 and that of the upper and lower electrode pieces 191b3 to 191b6 are different from each other.

For example, in the structure shown in FIG. 3B, a height of the upper and lower electrode pieces 191b3 to 191b6 is about half that of the middle electrode pieces 191a1, 191a2, 191b1, and 191b2. Accordingly, an area ratio of the first subpixel electrode 191a and the second subpixel electrode 191b is approximately 1:2.

In a structure shown in FIG. 3A, an area ratio of the first subpixel electrode 191a and the second subpixel electrode 191b is approximately 1:3.

A height of the middle electrode pieces 191a1, 191a2, 191b1, and 191b2 may be 1 to 2.5 times that of the upper and lower electrode pieces 191b3 to 191b6.

A desired area ratio can be obtained if a height of the upper and lower electrode pieces 191b3 to 191b6 is adjusted in this way, and an area ratio of approximately 1:3 to 1:1.1 is preferred.

The second subpixel electrode 191b shown in FIG. 4 includes four electrode pieces 191b1 to 191b4, and two electrode pieces 191b3 and 191b4 among them are disposed in an upper part and a lower part of the first subpixel electrode 191a.

A height of electrode pieces 191b3 and 191b4 that are disposed in an upper part and a lower part of the first subpixel electrode 191a is smaller than that of electrode pieces 191b1 and 191b2 that are disposed in a side surface of the first subpixel electrode 191a, and a height ratio thereof is, for example, about 1:2.

An area ratio of the first subpixel electrode 191a and the second subpixel electrode 191b can be adjusted by adjusting heights of four electrode pieces 191b1 to 191b4.

The second subpixel electrode 191b shown in FIG. 5 includes four electrode pieces 191b1 to 191b4, and has a three-time curved structure.

An area ratio can be adjusted by adjusting heights of the electrode pieces 191a1, 191a2, and 191b1 to 191b4.

In FIGS. 3A to 5, the positional relationship and direction of the first and second subpixel electrodes 191a and 191b can be changed, and the pixel electrode 191 of FIGS. 3A to 5 can be formed by vertically or laterally moving the first and second subpixel electrodes 191a and 191b in an inversion symmetry.

Figure 7A:
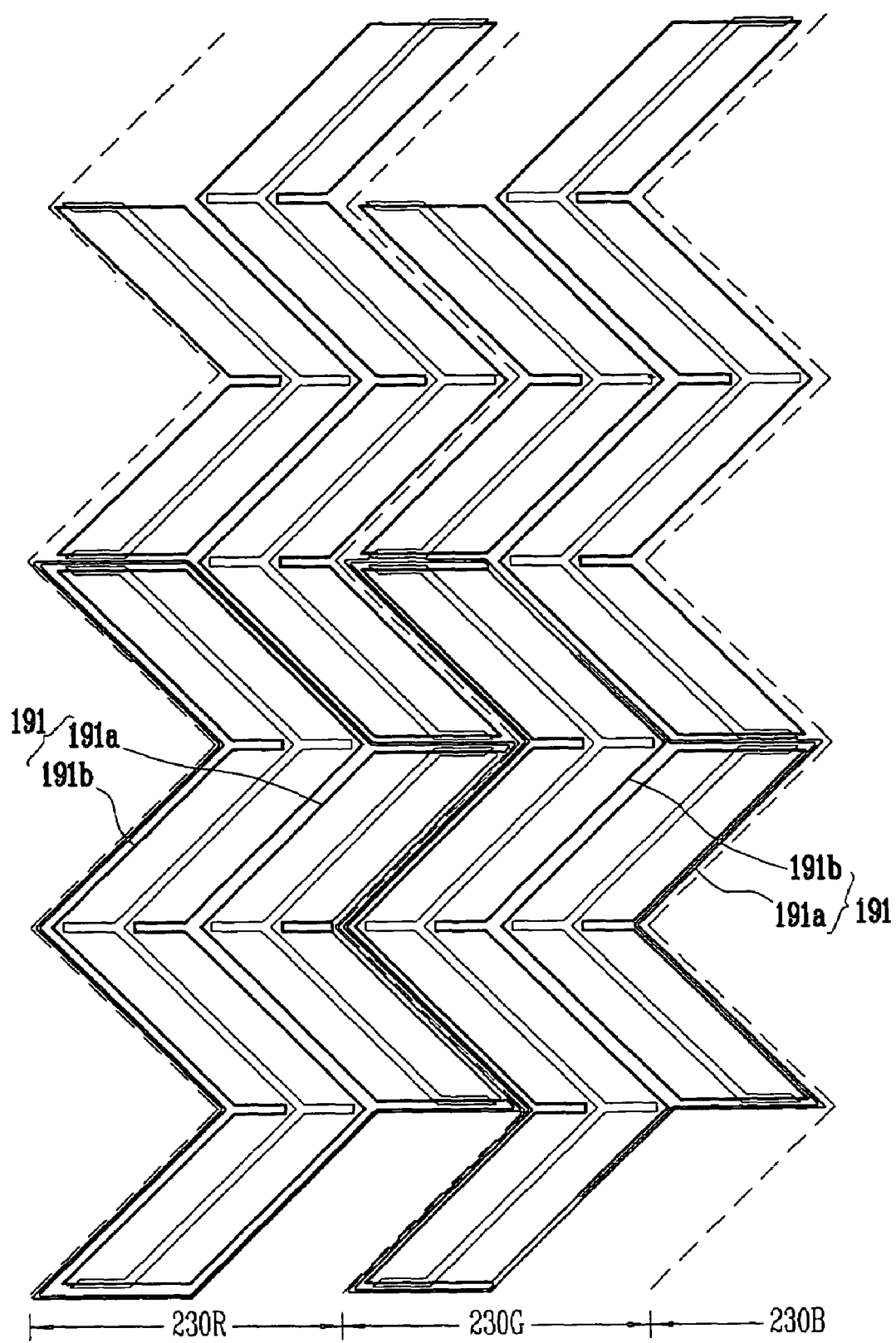
FIGS. 7A and 7B are schematic layout views of a liquid crystal panel assembly including a plurality of pixel electrodes shown in FIG. 5.

In an example shown in FIG. 7A, shapes of adjacent pixel electrodes 191 in a row direction are substantially equal to each other and a transverse center line of each of pixel electrodes 191 is in substantially the same straight line, and adjacent pixel electrodes 191 in a column direction are in lateral inversion symmetry with each other.

Red, green, and blue color filters 230R, 230G, and 230B extend along adjacent pixel electrodes 191 in a column direction.

Figure 7B:
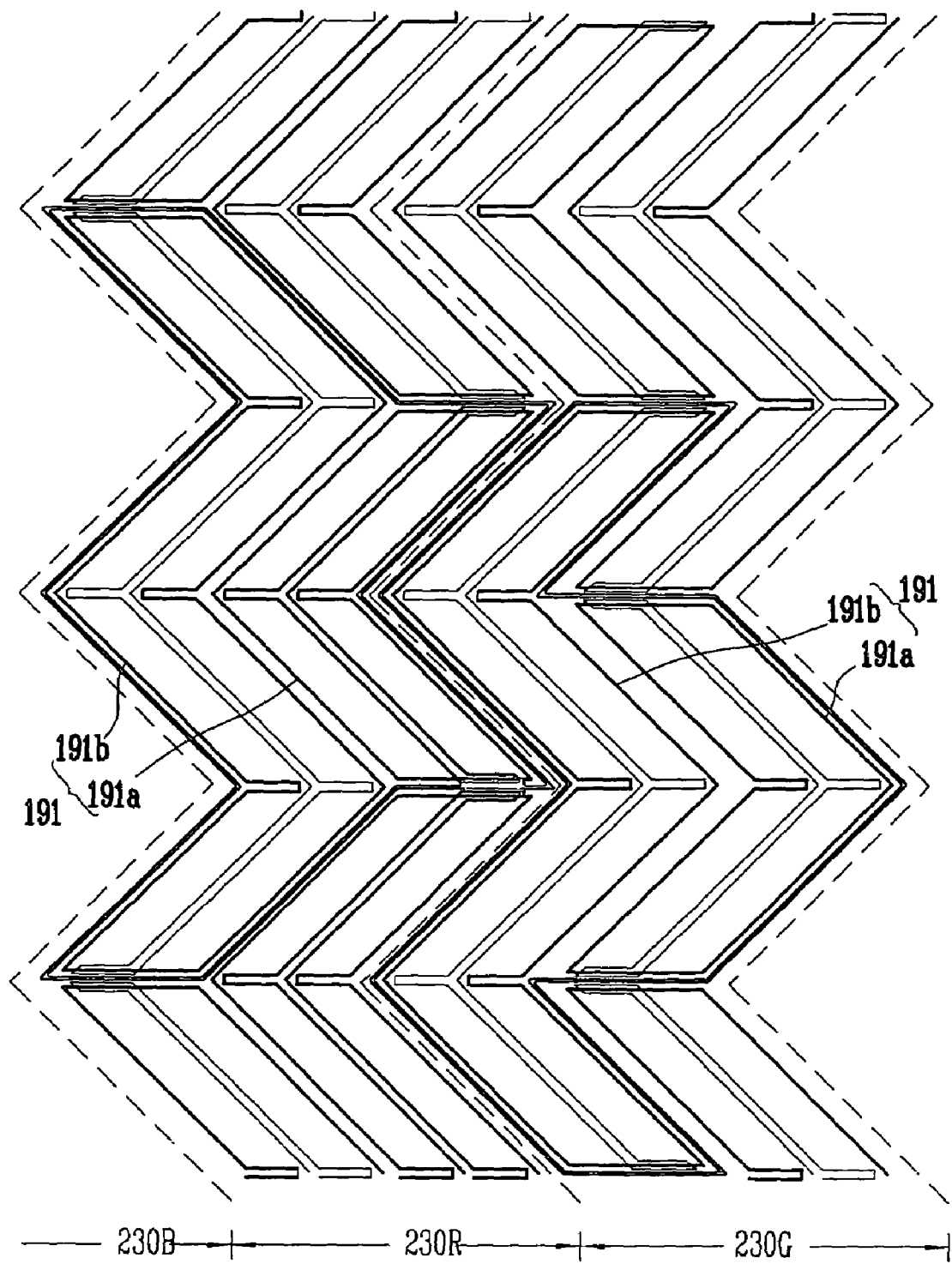

In an example shown in FIG. 7B, transverse center lines of adjacent pixel electrodes 191 in a row direction are unmatched. In two adjacent pixel electrodes 191 in a row direction, a transverse center line of a left pixel electrode 191 and an upper transverse edge of the first subpixel electrode 191a of a right pixel electrode 191 are in substantially the same straight line.

In two adjacent pixel electrodes 191 in a row direction, as the first subpixel electrode 191a is in the left side and the second subpixel electrode 191b is in the right side, lateral dispositions thereof are substantially equal to each other, but the first subpixel electrode 191a and the second subpixel electrode 191b are in inversion symmetry with each other.

Adjacent pixel electrodes 191 in a column direction are in lateral inversion symmetry to each other.

Red, green, and blue color filters 230R, 230G, and 230B extend along adjacent pixel electrodes 191 in a column direction.

In FIGS. 7A and 7B, the positional relationship of the pixel electrodes 191 can be changed, and neighboring pixel electrodes 191 in a row or column direction can be disposed to be unmatched in other manners.

Referring again to FIG. 1, a gray voltage generator 800 generates a plurality of gray voltages (or a reference gray voltage) related to transmittance of a pixel PX.

The gate driver 400 is connected to a gate line of the liquid crystal panel assembly 300 to apply a gate signal Vg comprising the combination of a gate-on voltage Von and a gate-off voltage Voff to the gate line.

The data driver 500 is connected to the data line of the liquid crystal panel assembly 300, selects a gray voltage from the gray voltage generator 800, and applies the gray voltage as a data signal to the data line.

However, when the gray voltage generator 800 provides only a predetermined number of reference gray voltages rather than all voltages for all grays, the data driver 500 generates gray voltages for all grays by dividing the reference gray voltage and selects a data signal among them.

The signal controller 600 controls the gate driver 400, the data driver 500, etc.

Each of the driving devices 400, 500, 600, and 800 may be directly mounted on the liquid crystal panel assembly 300 in a form of at least one IC chip, mounted on flexible printed circuit film (not shown) to attach to the liquid crystal panel assembly 300 in a tape carrier package (TCP), or mounted on a separate printed circuit board (PCB) (not shown).

Alternatively, the driving devices 400, 500, 600, and 800 may be integrated with the liquid crystal panel assembly 300.

Furthermore, the driving devices 400, 500, 600, and 800 may be integrated in a single chip, and at least one of these devices or at least one circuit element of these devices may be disposed outside of a single chip.

The signal controller 600 receives input image signals R, G, and B and an input control signal for controlling the display of the signals from an external graphics controller (not shown).

Input image signals R, G, and B have luminance information for each pixel PX and the luminance information has a predetermined number of grays, for example, $1024(=2^{10})$, $256(=2^8)$, or $64(=2^6)$ grays.

The input control signal includes, for example, a vertical synchronization signal Vsync, a horizontal synchronizing signal Hsync, a main clock signal MCLK, and a data enable signal DE.

The signal controller 600 appropriately processes input image signals R, G, and B to correspond to an operating condition of the liquid crystal panel assembly 300 and the data driver 500 based on input image signals R, G, and B and input control signals, generates a gate control signal CONT1 and a data control signal CONT2, then transfers the gate control signal CONT1 to the gate driver 400 and outputs the data control signal CONT2 and the processed image signal DAT to the data driver 500.

The output image signal DAT is output as a digital signal and has a predetermined value (or gray).

The gate control signal CONT1 includes a scanning start signal STV for instructing the start of scanning, and at least one clock signal for controlling an output period of a gate-on voltage Von.

The gate control signal CONT1 may further include an output enable signal OE for limiting a duration time of the gate-on voltage Von.

The data control signal CONT2 includes a horizontal synchronization start signal STH indicating the start of the transfer of image data for one set of subpixels, and a load signal LOAD and a data clock signal HCLK for applying a data signal to the liquid crystal panel assembly 300.

The data control signal CONT2 may further include an inversion signal RVS for inverting the voltage polarity of a data signal for a common voltage Vcom (hereinafter, "voltage polarity of a data signal for a common voltage" is briefly referred to as "polarity of a data signal").

As the data driver 500 receives digital image signals DAT for one set of subpixels and selects a gray voltage corresponding to each digital image signal DAT, depending on the data control signal CONT2 from the signal controller 600, the digital image signal DAT is converted to an analog data signal and then the signal is applied to a corresponding data line.

The gate driver 400 turns on the switching element that is connected to the gate lines by applying the gate-on voltage Von to the gate lines depending on the gate control signal CONT1 from the signal controller 600.

Then, a data signal that is applied to the data lines is applied to a corresponding subpixel PX through the turned-on switching element.

Referring to FIGS. 3 to 7B, when the first subpixel electrode 191*a* and the second subpixel electrode 191*b* constituting pixel electrode 191 are connected to a separate switching element, each subpixel may receive a separate data voltage through the same data line at different times or receive a separate data voltage through a different data line at the same time.

Alternatively, when the first subpixel electrode 191*a* is connected to a switching element (not shown) and the second subpixel electrode 191*b* is coupled to the first subpixel electrode 191*a* through capacitive coupling, only a subpixel including the first subpixel electrode 191*a* may receive a data voltage through a switching element, and a subpixel including the second subpixel electrode 191*b* may have a voltage that changes depending on the change of a voltage of the first subpixel electrode 191*a*.

A voltage of the first subpixel electrode 191*a* having a relatively small area is higher than that of the second subpixel electrode 191*b* having a relatively large area.

When a potential voltage difference is generated in both ends of the first or second liquid crystal capacitors Clca and Clcb, a primary electric field that is almost perpendicular to a surface of the display panels 100 and 200 is generated in the liquid crystal layer 3.

Hereinafter, a pixel electrode 191 and a common electrode 270 are referred to as "field generating electrodes." Liquid crystal molecules of the liquid crystal layer 3 are arranged so that a long axis thereof is perpendicular to a direction of an electric field in response to an electric field, and the degree of polarization of light incident to the liquid crystal layer 3 changes depending on an inclination angle of the liquid crystal molecules.

The change in polarization is represented by a change of transmittance by a polarizer, whereby a liquid crystal display displays an image.

An inclination angle of the liquid crystal molecules changes depending on the intensity of an electric field. Since voltages of two liquid crystal capacitors Clca and Clcb are different from each other, an inclination angle of the liquid crystal molecules changes, whereby luminance of two subpixels is changed.

Therefore, if a voltage of the first liquid crystal capacitor Clca and that of the second liquid crystal capacitor Clcb are properly adjusted, an image seen from the side can be most similar to that seen from the front, that is, a side gamma curve can be most similar to a front gamma curve, thereby improving side visibility.

Furthermore, if an area of the first subpixel electrode 191*a* that receives a high voltage is smaller than that of the second subpixel electrode 191*b*, a side gamma curve can be more similar to a front gamma curve.

Particularly, as shown in FIGS. 4A to 7B, when an area ratio of the first and second subpixel electrodes 191*a* and 191*b* is about 1:2 to about 1:3, a side gamma curve becomes much more similar to a front gamma curve, thereby improving side visibility.

An inclination direction of the liquid crystal molecules is firstly determined by a horizontal component that is generated by distorting a varying main electric field of subpixel electrodes 191*a* and 191*b* and cutouts 71*a*, 71*b*, 71*b*1, 71*b*2, 91*a*, 91*b*, and 92*b* of the field generating electrodes 191 and 270.

A horizontal component of the main electric field is almost perpendicular to an edge of the cutouts 71*a*, 71*b*, 71*b*1, 71*b*2, 91*a*, 91*b*, and 92*b* and an edge of the subpixel electrodes 191*a* and 191*b*.

Referring to FIGS. 3 to 7B, most liquid crystal molecules on each subregion that is divided by the cutouts 71*a*, 71*b*, 71*b*1, 71*b*2, 91*a*, 91*b*, and 92*b* are arranged in a direction perpendicular to a primary edge.

A direction of a secondary electric field that is secondarily generated by the voltage difference between the subpixel electrodes 191*a* and 191*b* is perpendicular to a primary edge of a subregion.

Therefore, a direction of a secondary electric field agrees with a direction of a horizontal component of a main electric field.

Finally, a secondary electric field between the subpixel electrodes 191*a* and 191*b* functions to enhance the determination of an inclination direction of liquid crystal molecules.

By repeating the process with a unit of one horizontal period (referred to as "1H", the same as one period of a horizontal synchronizing signal Hsync and a data enable signal DE), a data signal is applied to all pixels PX, so that an image of one frame is displayed.

A state of an inversion signal RVS that is applied to the data driver 500 is controlled so that a next frame starts when one frame ends, and the polarity of a data signal that is applied to each pixel PX is opposite to the polarity in a previous frame ("frame inversion").

According to characteristics of the inversion signal RVS even within one frame, the polarity of a data signal flowing through one data line may be changed (e.g., row inversion and dot inversion) or the polarity of the data signals that are applied to one set of pixels may be different from each other (e.g., column inversion and dot inversion).

A liquid crystal panel assembly according to an exemplary embodiment of the present invention will be described in detail with reference to FIGS. 1, 2, 4A, 6, and 8 to 12.

Figure 8:
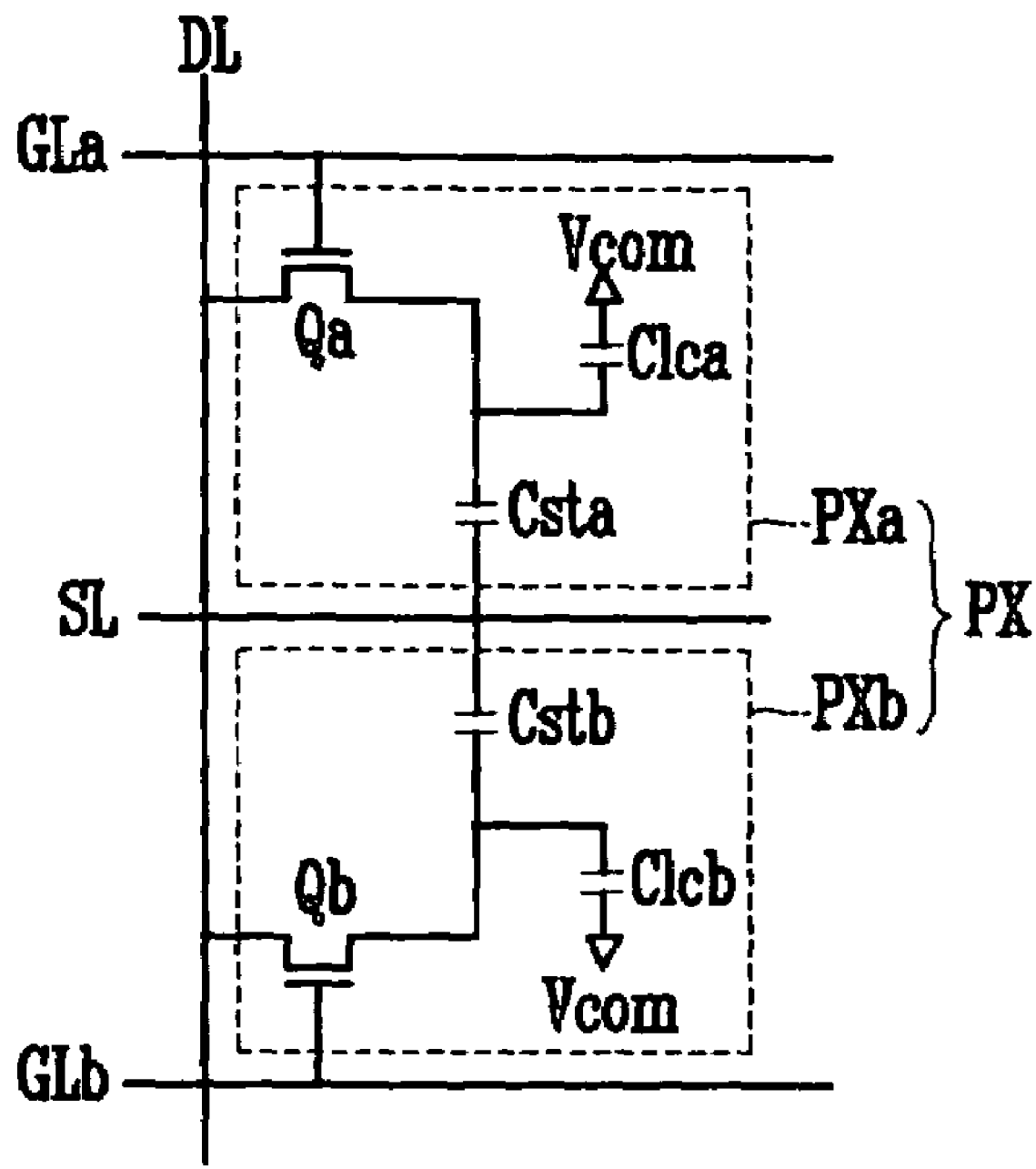
FIG. 8 is an equivalent circuit diagram of a pixel of a liquid crystal panel assembly according to an exemplary embodiment of the present invention.

FIG. 8 is an equivalent circuit diagram of a pixel of a liquid crystal panel assembly according to an exemplary embodiment of the present invention.

Referring to FIG. 8, the liquid crystal panel assembly includes a signal line including a plurality of pairs of gate lines GLa and GLb, a plurality of data lines DL, and a plurality of storage electrode lines SL and a plurality of pixels PX that are connected thereto.

Each pixel PX includes a pair of subpixels PXa and PXb, and the respective subpixels PXa and PXb include switching elements Qa and Qb that are connected to corresponding gate lines GLa and GLb and data lines DL, liquid crystal capacitors Clca and Clcb that are connected thereto, and storage capacitors Csta and Cstb that are connected to the switching elements Qa and Qb and the storage electrode lines SL.

The switching elements Qa and Qb are three terminal elements such as a thin film transistor that are provided in the lower panel 100. A control terminal thereof is connected to the gate lines GLa and GLb, an input terminal thereof is connected to the data line DL, and an output terminal thereof is connected to the liquid crystal capacitors Clca and Clcb and the storage capacitors Csta and Cstb.

The storage capacitors Csta and Cstb assist the liquid crystal capacitors Clca and Clcb and are formed with the overlap of a storage electrode line SL and a pixel electrode PE that are provided in the lower panel 100 with an insulator interposed therebetween. A predetermined voltage such as a common voltage Vcom is applied to the storage electrode line SL.

However, the storage capacitors Csta and Cstb may be formed with the overlap of the subpixel electrodes PEa and PEb and a previous gate line directly on the subpixel electrodes PEa and PEb via an insulator.

The signal controller 600 can receive input image signals R, G, and B for one pixel PX, convert the signals to an output image signal DAT for subpixels PXa and PXb, and transmit the signals to the data driver 500.

Alternatively, in the gray voltage generator 800, by separately making a gray voltage set for subpixels PXa and PXb, providing them to the data driver 500 or selecting them in the data driver 500, a different voltage can be applied to the two subpixels PXa and PXb.

However, it is preferable to modify an image signal or make a gray voltage set so that a composition gamma curve of subpixels PXa and PXb become similar to a reference gamma curve in the front.

For example, a composition gamma curve in the front is adjusted to agree with a reference gamma curve in the front to be most suitable for the liquid crystal panel assembly, and a composition gamma curve in the side is adjusted to be most similar to the reference gamma curve in the front.

An example of the liquid crystal panel assembly shown in FIG. 8 will be described in detail with reference to FIGS. 3B, 9, and 10.

Figure 9:
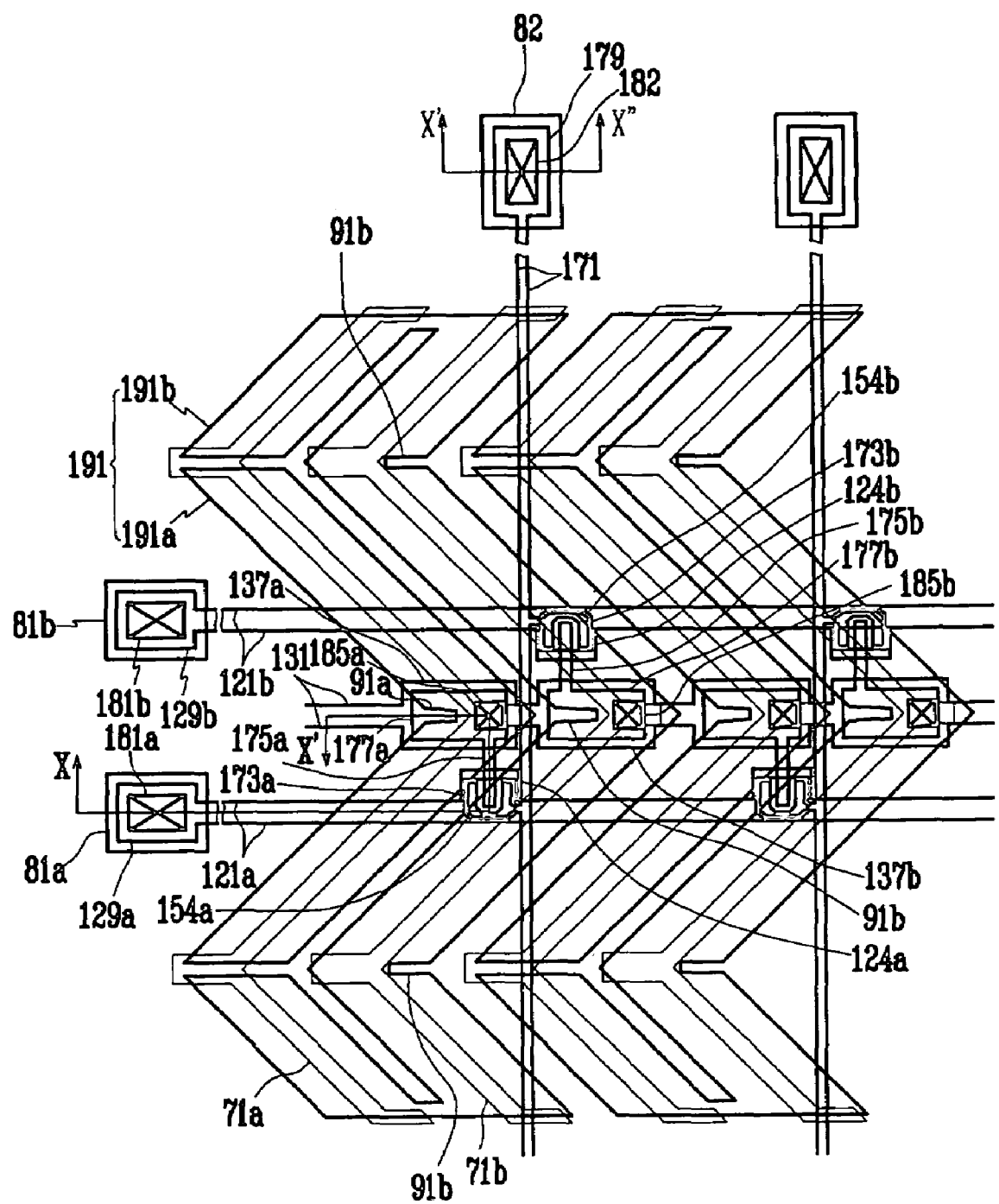
FIG. 9 is a layout view of a liquid crystal panel assembly according to an exemplary embodiment of the present invention.
Figure 10:
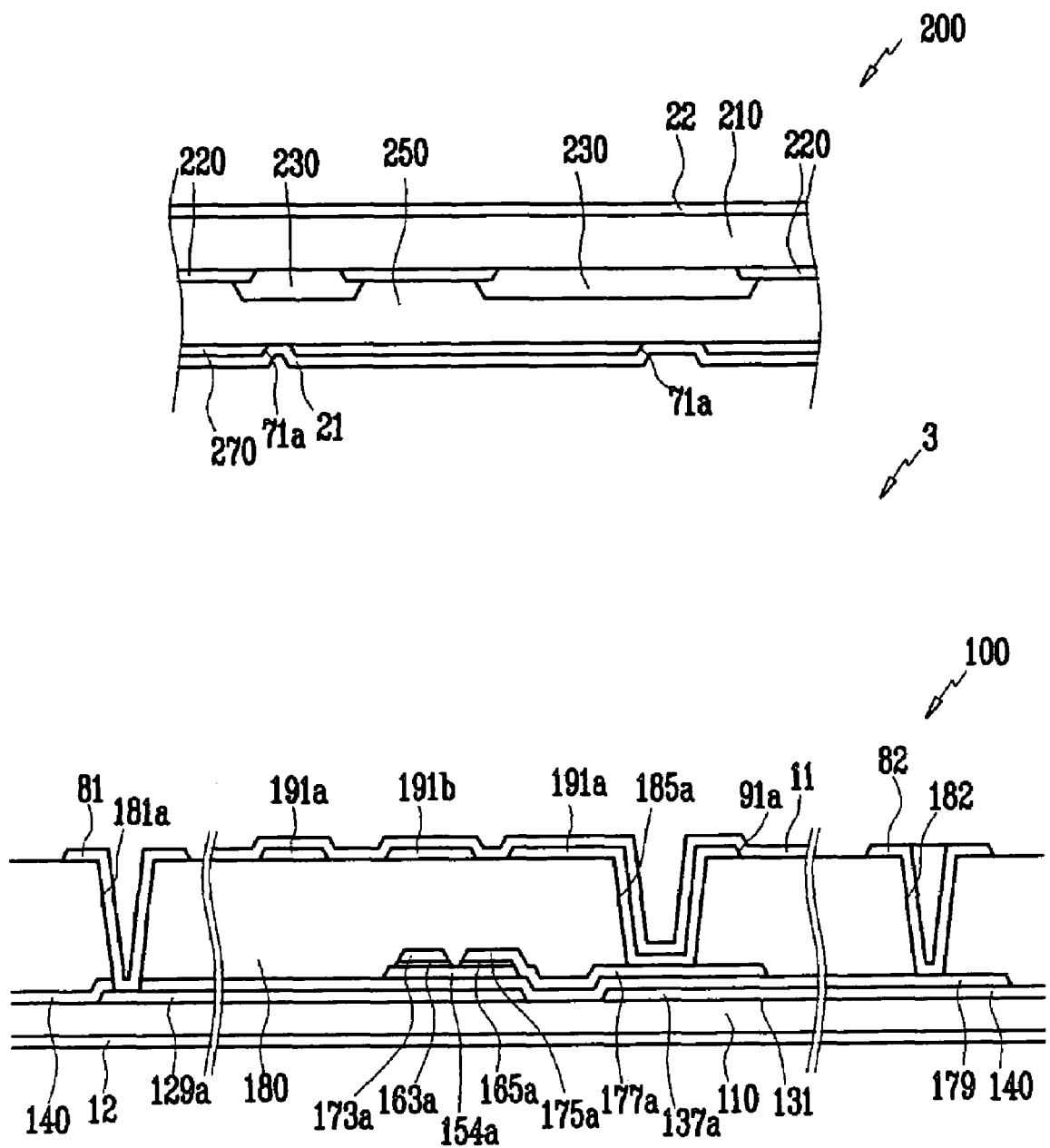
FIG. 10 is a cross-sectional view of a liquid crystal panel assembly taken along line X-X'-X" of FIG. 9.

FIG. 9 is a layout view of a liquid crystal panel assembly according to an exemplary embodiment of the present invention, and FIG. 10 is a cross-sectional view of a liquid crystal panel assembly taken along line X-X'-X" of FIG. 9.

Referring to FIGS. 9 and 10, the liquid crystal panel assembly includes a lower panel 100 and an upper panel 200 that are opposite to each other, and a liquid crystal layer 3 therebetween.

A plurality of gate conductors including a plurality of pairs of first and second gate lines 121a and 121b and a plurality of storage electrode lines 131 are formed on the insulation substrate 110. The insulation substrate 110 may be made of for example transparent glass, or plastic.

The first and second gate lines 121a and 121b transfer a gate signal, and extend mainly in a horizontal direction and are positioned in the lower side and the upper side, respectively.

The first gate line 121a includes a wide end part 129a for connecting a plurality of first gate electrodes 124a that protrude to the upper side, to other layers or the gate driver 400.

The second gate line 121b includes a wide end part 129b for connecting a plurality of second gate electrodes 124a that protrude to the lower side, to other layers or the gate driver 400.

When the gate driver 400 is integrated with the substrate 110, the gate lines 121a and 121b are extended to directly connect thereto.

The storage electrode line 131 receives a predetermined voltage such as a common voltage Vcom, and extend mainly in a horizontal direction.

Each of the storage electrode lines 131 is positioned between the first gate line 121a and the second gate line 121b, and maintains an almost equal distance from gate lines 121a and 121b.

Each storage electrode line 131 includes a plurality of pairs of first and second storage electrodes 137a and 137b that are vertically extended.

However, the shape and disposition of the storage electrodes 137a and 137b and the storage electrode line 131 may be variously changed.

The gate conductors 121a, 121b, and 131 may be made of metals such as aluminum (Al), silver (Ag), copper (Cu), molybdenum (Mo), chromium (Cr), thallium (Ta), titanium (Ti), and/or alloys thereof.

However, the gate conductors 121a, 121b, and 131 may also have a multilayer structure including two conductive layers (not shown) that have different physical properties.

One conductor layer among them may be made of a metal having low resistivity, for example, aluminum metals, silver metals, or copper metals, thereby reducing signal delay or voltage drop.

Alternatively, the other conductor layer may be made of a metal having Mo, Cr, Ta, Ti and/or a material having good physical, chemical, and electrical contact characteristics with other materials, such as ITO (indium tin oxide) and IZO (indium zinc oxide).

An example of such a combination may include a chromium lower layer and an aluminum (alloy) upper layer, and an aluminum (alloy) lower layer and a molybdenum (alloy) upper layer.

However, the gate conductors 121a, 121b, and 131 may made of other various metals or electrical conductors.

Side surfaces of the gate conductors 121a, 121b, and 131 are inclined to a surface of the substrate 110, and an inclination angle thereof may be about 30° to 80°.

A gate insulating layer 140, which is made of materials such as, for example, silicon nitride SiNx, or silicon oxide SiOx, is formed on the gate conductors 121a, 121b, and 131.

A plurality of first and second semiconductor islands 154a and 154b, which are made of materials such as, for example hydrogenated amorphous silicon (a-Si), or polysilicon, are formed on the gate insulating layer 140.

The first and second semiconductors 154a and 154b are positioned on the first and second gate electrodes 124a and 124b, respectively.

A pair of ohmic contact islands 163a and 165a are formed on each of the first semiconductors 154a, and a pair of ohmic contact islands (not shown) are formed on each of the second semiconductors 154b.

The ohmic contact islands 163a and 165a may be made of a material such as n+ hydrogenated amorphous silicon in which an n-type impurity such as phosphorus is doped with a high concentration, or silicide.

Side surfaces of the semiconductors 154a and 154b and the ohmic contact islands 163a and 165a are also inclined to the surface of the substrate 110, and an inclination angle thereof is about 30° to 80°.

A data conductor including a plurality of data lines 171 and a plurality of pairs of first and second drain electrodes 175a and 175b is formed on the ohmic contacts 163a and 165a and the gate insulating layer 140.

Each of the data lines 171 transfers a data signal, and extends in a vertical direction to intersect the gate lines 121a and 121b and the storage electrode line 131.

Each of the data lines 171 includes a wide end part 179 for connecting a plurality of pairs of first and second source electrodes 173a and 173b that extend toward the first and second gate electrodes 124a and 124b to other layers or the data driver 500.

When the data driver 500 is integrated with the substrate 110, the data lines 171 extend to directly connect thereto.

The first and second drain electrodes 175a and 175b are separated from each other and are also separated from each of the data lines 171.

The first and second drain electrodes 175a and 175b face the first and second source electrodes 173a and 173b about the first and second gate electrode 124a and 124b, and each includes wide end parts 177a and 177b and a bar shaped end part.

The wide end parts 177a and 177b are overlapped with the first and second storage electrodes 137a and 137b, respectively, and a part of the bar shaped end part is surrounded by the curved first and second source electrodes 173a and 173b.

The first and second gate electrodes 124a and 124b, the first and second source electrodes 173a and 173b, the first and second drain electrodes 175a and 175b, and the first and second semiconductors 154a and 154 constitute first and second thin film transistors TFT Qa and Qb. A channel of the first and second thin film transistors is formed in the first and second semiconductors 154a and 154b between the first and second source electrodes 173a and 173b and the first and second drain electrodes 175a and 175b.

Data conductors 171, 175a, and 175b may be made of a refractory metal such as molybdenum, chromium, tantalum, and titanium, or their alloys. The data conductors 171, 175a, and 175b may have a multilayer structure including a refractory metal layer (not shown) and a low resistance conductive layer (not shown).

A multilayer structure includes, for example, a dual-layer of a chromium or molybdenum (alloy) lower layer and an aluminum (alloy) upper layer, and a triple-layer of a molybdenum (alloy) lower layer, an aluminum (alloy) middle layer, and a molybdenum (alloy) upper layer.

However, the data conductors 171, 175a, and 175b may be made of other various metals or conductors.

Side surfaces of the data conductors 171, 175a, and 175b may be inclined to the surface of the substrate 110, and an inclination angle thereof may be about 30° to 80'.

The ohmic contact islands 163a and 165a are present between the semiconductors 154a and 154b in a lower part thereof and the data conductors 171, 175a, and 175b in an upper part thereof, and reduce contact resistance between them.

The semiconductors 154a and 154b have a portion that is exposed without being covered by the data conductors 171, 175a, and 175b, and a portion between the source electrodes 173a and 173b and the drain electrodes 175a and 175b.

A passivation layer 180 is formed on the data conductors 171, 175a, and 175b and the exposed portion of the semiconductors 154a and 154b.

The passivation layer 180 may be made of materials such as an inorganic insulator, or an organic insulator, and may have a flat surface.

The organic insulator may have a dielectric constant of 4.0 or less, and may have photosensitivity.

The passivation layer 180 may also have a dual-layer structure of a lower inorganic layer and an upper organic layer so as not to cause damage in the exposed portion of the semiconductors 154a and 154b maintaining the desirable insulating characteristics of the organic layer.

A plurality of contact holes 182, 185a, and 185b for exposing the end part 179 of the data lines 171 and the wide end parts 177a and 177b of the first and second drain electrodes 175a and 175b are formed in the passivation layer 180. A plurality of contact holes 181a and 181b for exposing the end parts 129a and 129b of the gate lines 121a and 121b are formed in the passivation layer 180 and the gate insulating layer 140.

A plurality of pixel electrodes 191 and a plurality of contact assistants 81a, 81b, and 82 are formed on the passivation layer 180.

The pixel electrodes 191 may be made of a transparent conductive material such as ITO or IZO, or a reflective metal such as aluminum, silver, chromium, or their alloys.

Each of the pixel electrodes 191 includes the first and second subpixel electrodes 191a and 191b, and each of the subpixel electrodes 191a and 191b has cutouts 91a and 91b.

The storage electrode line 131, the extensions 177a and 177b of the drain electrodes 175a and 175b, and the contact holes 185a and 185b are positioned at a transverse center line of the subpixel electrodes 191a and 191b.

A straight line that connects a curved point of subpixel electrodes 191a and 191b is the border of a subregion described above, and at this part, arrangement of liquid crystal molecules is scattered, thereby generating texture.

Therefore, the disposition can allow an aperture ratio to improve while not exposing texture.

Furthermore, a length in which each of the data lines 171 is overlaps with a first subpixel electrode 191a of one pixel electrode 191 and a length in which each of the data lines 171 overlaps with a neighboring second subpixel electrode 191b of the pixel electrode 191 may be substantially equal to each other.

The first and second subpixel electrodes 191a and 191b are connected to the first and second drain electrodes 175a and 175b through the contact holes 185a and 185b.

The first and second subpixel electrodes 191a and 191b, a common electrode 270 of the upper panel 200, and the liquid crystal layer 3 therebetween constitute first and second liquid crystal capacitors Clca and Clcb, and the first and second subpixel electrodes 191a and 191b and the common electrode 270 maintain an applied voltage even after the thin film transistors Qa and Qb are turned off.

Wide end parts 177a and 177b of the first and second drain electrodes 175a and 175b that are connected to the first and second subpixel electrodes 191a and 191b overlap with the first and second storage electrodes 137a and 137b with the gate insulating layer 140 interposed therebetween, and constitute the first and second storage capacitors Csta and Cstb. The first and second storage capacitors Csta and Cstb enhance voltage storage ability of the first and second liquid crystal capacitors Clca and Clcb.

The contact assistants 81a, 81b, and 82 are connected to end parts 129a and 129b of the gate line 121 and an end part 179 of each of the data lines 171 through the contact holes 181a, 181b, and 182, respectively.

The contact assistants 81a, 81b, and 82 support adhesion between the end parts 129a and 129b of the gate lines 121a and 121b and the end part 179 of each of the data lines 171 and an external apparatus, and protect them.

A light blocking member 220 is formed on the insulation substrate 210 and may be made of a material such as transparent glass, or plastic.

The light blocking member 220 includes a curved portion corresponding to the curved edge of the pixel electrode 191 and a quadrangle portion corresponding to a thin film transistor, prevents light leakage between the pixel electrodes 191, and defines a region that is opposite to the pixel electrode 191.

A plurality of color filters 230 are formed on the substrate 210 and the light blocking member 220. The color filters 230 are present within a region that is surrounded by the light blocking member 230, and extend long along a column of the pixel electrode 191. Each of the color filters 230 can display one of three primary colors such as red, green, and blue.

An overcoat 250 is formed on each of the color filters 230 and the light blocking member 220. The overcoat 250 may be made of an (organic) insulating material, preventing each of the color filters 230 from being exposed, and providing a flat surface. The overcoat 250 is optional.

A common electrode 270 may be formed on the overcoat 250. The common electrode 270 may be made of a transparent conductor such as ITO, or IZO and have a plurality of cutouts 71a and 71b.

The number of cutouts 71a and 71b may be changed depending on design elements. As the light blocking member 220 overlaps with the cutouts 71a and 71b, they can block light leakage around the cutouts 71a and 71b.

Alignment layers 11 and 21 are formed on an inner surface of the display panels 100 and 200, and may be vertical alignment layers.

Polarizers 12 and 22 are provided in the outer surface of the display panels 100 and 200. Polarization axes of two polarizers 12 and 22 may be orthogonal and a single polarization axis among them may be parallel to the gate lines 121a and 121b. In a reflective liquid crystal display, one of two polarizers 12 and 22 is optional.

A liquid crystal display may include polarizers 12 and 22, a phase delay layer, display panels 100 and 200, and a backlight unit (not shown) for supplying light to the liquid crystal layer 3.

The liquid crystal layer 3 has negative dielectric anisotropy, and liquid crystal molecules of the liquid crystal layer 3 are aligned so that long axes thereof are perpendicular to a surface of the two display panels in a state where there is no electric field.

The cutouts 71a and 71b may be replaced with a protrusion (not shown) or a depression (not shown).

The protrusion may be made of an organic material or an inorganic material, and may be disposed on or under the field generating electrodes 191 and 270.

Figure 11:
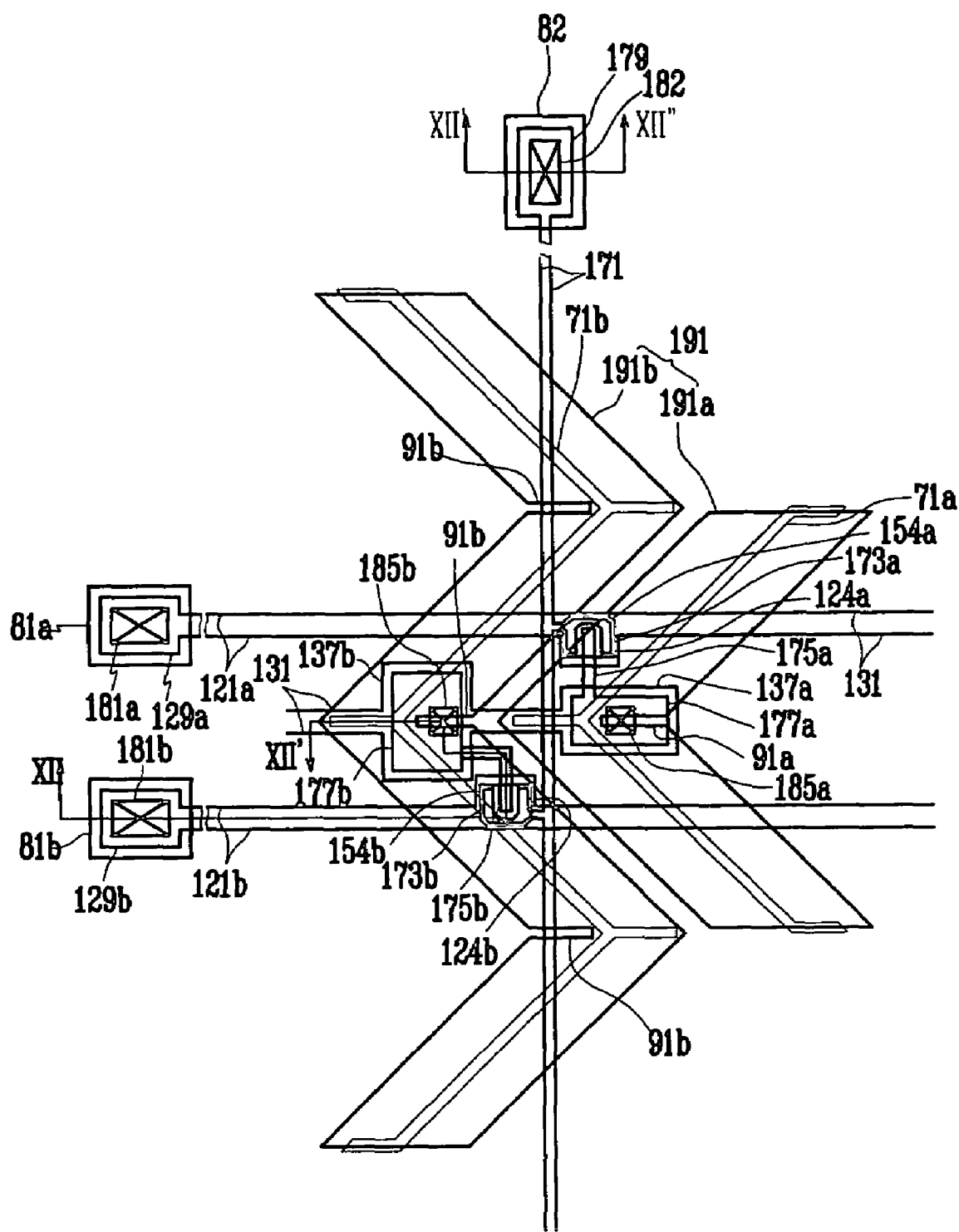
FIG. 11 is a layout view of a liquid crystal panel assembly according to an exemplary embodiment of the present invention.
Figure 12:
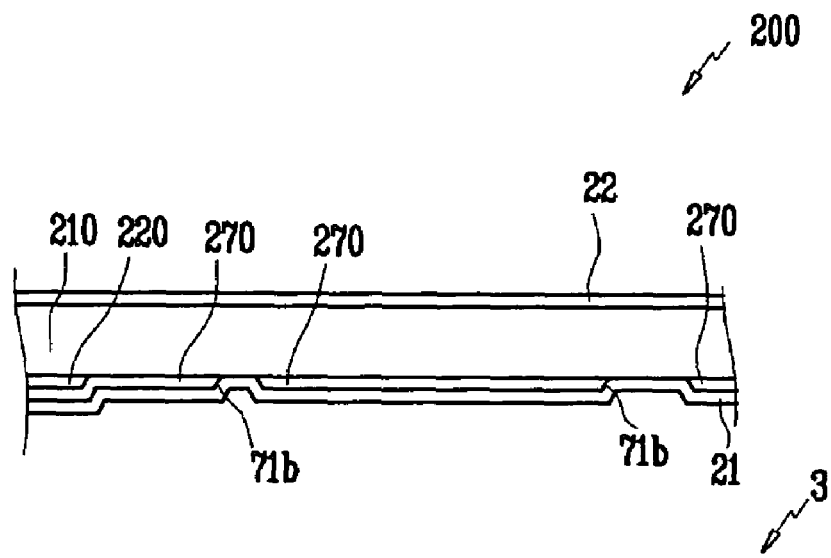
FIG. 12 is a cross-sectional view of a liquid crystal panel assembly taken along line XII-XII'-XII" of FIG. 11.
Figure 12:
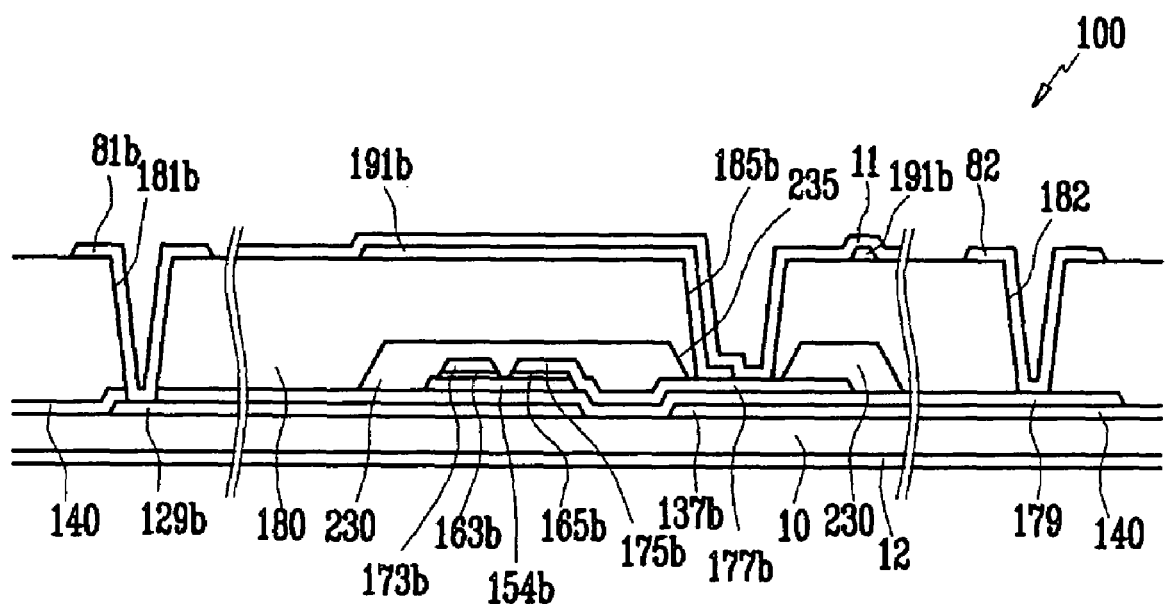

FIG. 11 is a layout view of a liquid crystal panel assembly according to an exemplary embodiment of the present invention, and FIG. 12 is a cross-sectional view of a liquid crystal panel assembly taken along line XII-XII'-XII" of FIG. 11.

Referring to FIGS. 11 and 12, the liquid crystal panel assembly includes a lower panel 100, an upper panel 200, and a liquid crystal layer 3 therebetween.

A layered structure of the liquid crystal panel assembly is substantially the same as the layered structure of the liquid crystal panel assembly shown in FIGS. 9 and 10.

A gate conductor including a plurality of pairs of first and second gate lines 121a and 121b and a plurality of storage electrode lines 131 is formed on the insulation substrate 110.

The first and second gate lines 121a and 121b include the first and second gate electrodes 124a and 124b and end parts 129a and 129b, respectively.

A gate insulating layer 140 is formed on the gate conductors 121a, 121b, and 131.

A plurality of semiconductors 154a and 154b are formed on the gate insulating layer 140, and a plurality of ohmic contacts 163b and 165b are formed thereon.

A data conductor including a plurality of data lines 171 and a plurality of first and second drain electrodes 175a and 175b is formed on the ohmic contacts 163b and 165b.

Each of the data lines 171 includes a plurality of first and second source electrodes 173a and 173b and an end part 179, and the drain electrodes 175a and 175b include wide end parts 177a and 177b.

A passivation layer 180 is formed on the data conductors 171, 175a, and 175b and the exposed parts of the semiconductors 154a and 154b. A plurality of contact holes 181a, 181b, 182, 185a, and 185b are formed on the passivation layer 180 and the gate insulating layer 140.

A plurality of pixel electrodes 191 including the first and second subpixel electrodes 191a and 191b and a plurality of contact assistants 81a, 81b, and 82 are formed on the passivation layer 180, and cutouts 91a and 91b are formed in the first and second subpixel electrodes 191a and 191b, respectively.

An alignment layer 11 is formed on the pixel electrodes 191, the contact assistants 81a, 81b, and 82, and the passivation layer 180.

A light blocking member 220, a common electrode 270 having cutouts 71a and 71b, and an alignment layer 21 are formed on the insulation substrate 210.

However, unlike the liquid crystal panel assembly shown in FIGS. 9 and 10, disposition of the subpixel electrodes 191a and 191b is substantially the same as that shown in FIG. 5.

Compared with the liquid crystal panel assembly shown in FIGS. 9 and 10, a vertical position of the first and second gate lines 121a and 121b is opposite thereto, and thus a lateral position of the first and second thin film transistors Qa and Qb is opposite about each of the data lines 171.

The first and second storage electrodes 137a and 137b are also positioned in the right side and the left side about the data lines 171. An area of the second storage electrode 137b is larger than that of the first storage electrode 137a and the former is about two times that of the latter.

A wide end part 177b of the second drain electrode 175b has a larger area than a wide end part 177a of the first drain electrode 175a, and the former is about two times that of the latter.

There is no color filter in the upper panel 200, and a plurality of color filters 230 is formed under the passivation layer 180 of the lower panel 100.

Each of the color filters 230 extend in a vertical direction while being periodically covered along a column of the pixel electrodes 191, and do not exist in a peripheral area of the end parts 129a and 129b of the gate lines 121a and 121b and the end part 179 of the data line 171.

A penetrating hole 235 that passes the contact hole 185b and that is larger than the contact hole 185b is formed in the color filters 230.

A neighboring one of the color filters 230 may function as a light blocking member for blocking leaking light between neighboring pixel electrodes 191 by overlapping the data lines 171, making the light blocking member of the upper panel 200 optional.

A passivation layer (not shown) may be provided under the color filters 230.

A liquid crystal panel assembly according to an exemplary embodiment of the present invention will be described in detail with reference to FIGS. 1, 2, 3B, and 13 to 15.

Figure 13:
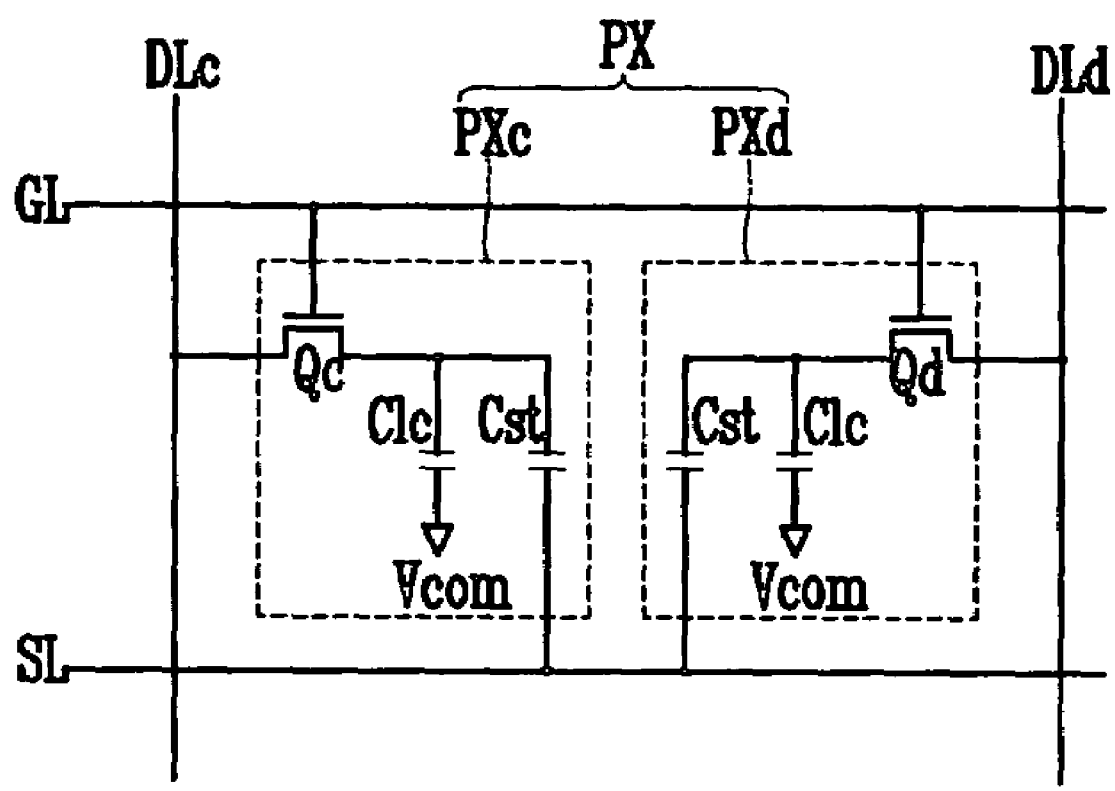
FIG. 13 is an equivalent circuit diagram of a pixel of a liquid crystal panel assembly according to an exemplary embodiment of the present invention.

FIG. 13 is an equivalent circuit diagram of a pixel of a liquid crystal panel assembly according to an exemplary embodiment of the present invention.

Referring to FIG. 13, the liquid crystal panel assembly includes signal lines including a plurality of gate lines GL, a plurality of pairs of data lines DLc and DLd, and a plurality of storage electrode lines SL and a plurality of pixels PX that are connected thereto.

Each pixel PX includes a pair of subpixels PXc and PXd, and the respective subpixels PXc and PXd include switching elements Qc and Qd that are connected to a corresponding gate line GL and data lines DLc and DLd, liquid crystal capacitors Clcc and Clcd that are connected thereto, and storage capacitors Cstc and Cstd that are connected to the switching elements Qc and Qd and the storage electrode line SL.

Each of the switching elements Qa and Qb is also a three terminal element such as a thin film transistor that is provided in the lower panel 100, and a control terminal thereof is connected to the gate line GL, an input terminal thereof is connected to the data lines DLc and DLd, and an output terminal thereof is connected to the liquid crystal capacitors Clcc and Clcd and the storage capacitors Cstc and Cstd.

Subpixels PXa and PXb constitute a pixel PX in the liquid crystal display shown in FIG. 8 sequentially receive a data voltage, but in the present exemplary embodiment, two subpixels PXc and PXd simultaneously receive a data voltage.

An example of the liquid crystal panel assembly shown in FIG. 13 will be described in detail with reference to FIGS. 3B, 14, and FIG. 15.

Figure 14:
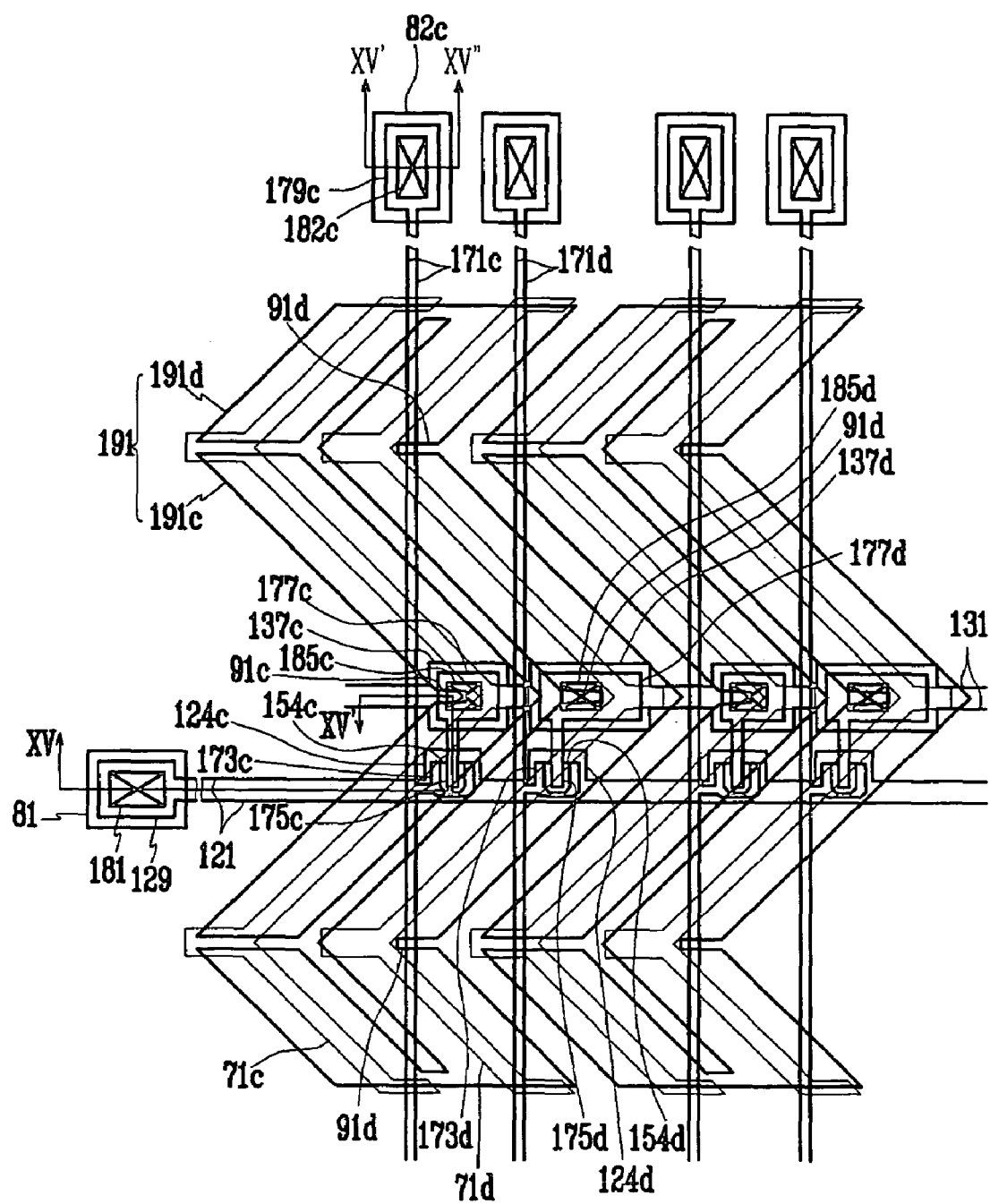
FIG. 14 is a layout view of a liquid crystal panel assembly according to an exemplary embodiment of the present invention.
Figure 15:
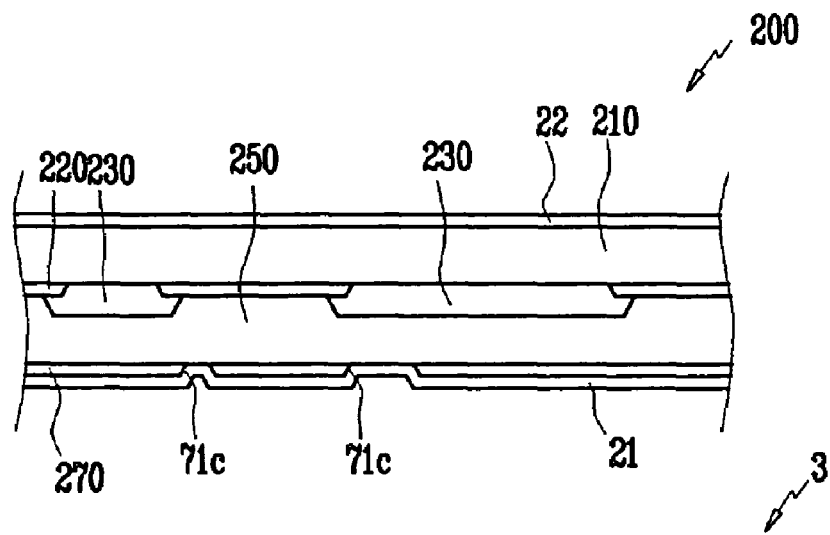
FIG. 15 is a cross-sectional view of a liquid crystal panel assembly taken along line XV-XV'-XV" of FIG. 14.
Figure 15:
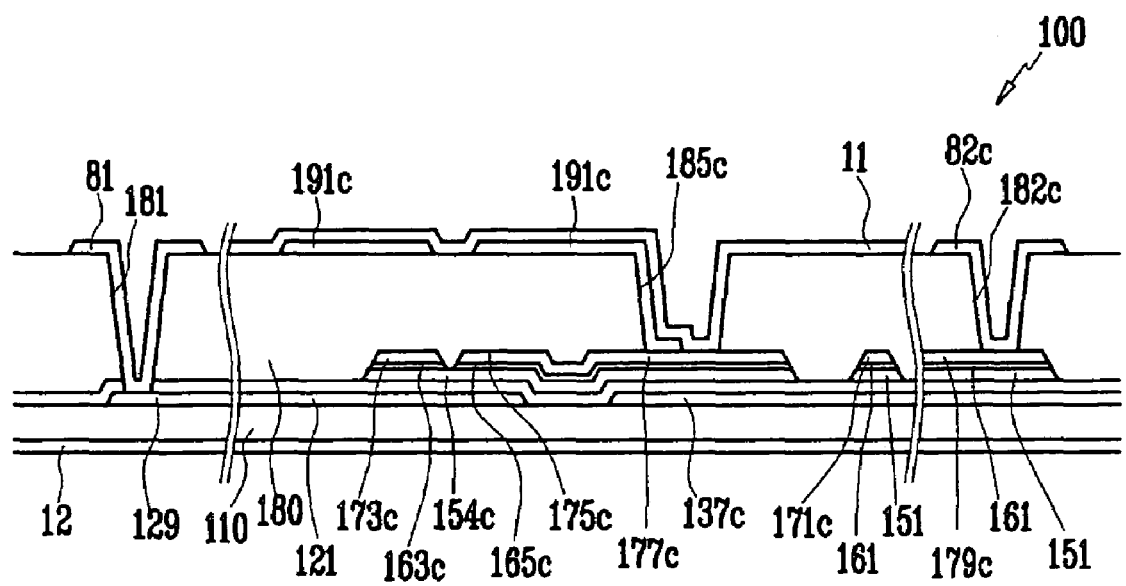

FIG. 14 is a layout view of a liquid crystal panel assembly according to an exemplary embodiment of the present invention, and FIG. 15 is a cross-sectional view of the liquid crystal panel assembly taken along line XV-XV'-XV" of FIG. 14.

Referring to FIGS. 14 and 15, the liquid crystal panel assembly includes a lower panel 100 and an upper panel 200 that are opposite to each other, and a liquid crystal layer 3 therebetween.

A layered structure of the liquid crystal panel assembly is substantially the same as that of the liquid crystal panel assembly shown in FIGS. 9 and 10.

A plurality of gate conductors including a plurality of gate lines 121 and a plurality of storage electrode lines 131 are formed on the insulation substrate 110.

Each of the gate lines 121 includes the first and second gate electrodes 124c and 124d and an end part 129.

A gate insulating layer 140 is formed on the gate conductors 121 and 131.

A plurality of semiconductor stripes 151 including the first and second protrusions 154c and 154d are formed on the gate insulating layer 140, and a plurality of ohmic contact stripes 161 and a plurality of ohmic contact islands 165c having protrusions 163c are formed thereon.

A data conductor including a plurality of pairs of first and second data lines 171c and 171d and a plurality of first and second drain electrodes 175c and 175d is formed on the ohmic contacts 161 and 165c.

The first and second data lines 171c and 171d include a plurality of first and second source electrodes 173c and 173d, respectively, and an end part 179c and the first and second drain electrodes 175c and 175d include protrusions 177c and 177d.

A passivation layer 180 is formed on the data conductors 171c, 171d, 175c, and 175d and the exposed parts of the semiconductors 154c and 154d, and a plurality of contact holes 181, 182c, 182d, 185c, and 185d are formed on the passivation layer 180 and the gate insulating layer 140.

A plurality of pixel electrodes 191 including the first and second subpixel electrodes 191c and 191d and a plurality of contact assistants 81, 82c, and 82d are formed on the passivation layer 180, and cutouts 91c and 91d are formed in the first and second subpixel electrodes 191c and 191d, respectively.

An alignment layer 11 is formed on the pixel electrode 191, the contact assistants 81, 82c, and 82d, and the passivation layer 180.

A light blocking member 220, a common electrode 270 having a plurality of color filters 230, an overcoat 250, cutouts 71c and 71d, and an alignment layer 21 are formed on the insulation substrate 210.

In a liquid crystal panel assembly according to the present exemplary embodiment, the number of gate lines 121 is half and the number of data lines 171c and 171d is twice, compared with the liquid crystal panel assembly shown in FIGS. 9 and 10.

The first and second thin film transistors Qc and Qd that are connected to the first and second subpixel electrodes 191c and 191d constituting pixel electrode 191 are connected to the same gate line 121 and different data lines 171c and 171d.

The first and second thin film transistors Qc and Qd are positioned in the right side of the first and second data lines 171c and 171d.

The semiconductors 154c and 154d extend along the data line 171 and the drain electrodes 175c and 175d to constitute a semiconductor stripe 151, and the ohmic contact 163c extends along the data line 171 to constitute an ohmic contact stripe 161.

The semiconductor stripe 151 has substantially the same flat shape as each of the data line 171s, the drain electrodes 175c and 175d, and the lower ohmic contacts 161 and 165c.

Although the data lines 171 comprise a pair of lines, transmittance is considerably improved.

A data voltage may be applied to the first and second subpixel electrodes 191c and 191d without greatly deteriorating an aperture ratio.

Thereafter, in a method of manufacturing a thin film transistor array panel according to an exemplary embodiment of the present invention, a data line 171, drain electrodes 175c and 175d, a semiconductor 151, and ohmic contacts 161 and 165c are formed with one photolithography process.

In a photosensitive film that is used in a photolithography process, a thickness thereof changes depending on a position thereof, and the photosensitive film includes a first part and a second part, particularly in decreasing order of thickness.

The first part is positioned in a wiring region where the data line 171 and the drain electrodes 175c and 175d are positioned, and the second part is positioned in a channel region of a thin film transistor.

There are several methods of changing a thickness of a photosensitive film depending on position, and the methods include, for example, a method of providing a light transmitting area, a light blocking area, and a translucent area in a photomask.

A thin film that has a slit pattern or a lattice pattern is provided in a translucent area. When a slit pattern is used, a width of a slit or an interval between slits may be smaller than the resolution of a light exposer that is used in a photolithography process.

Another example includes a method of using a photosensitive film that can flow. After forming the photosensitive film that can flow with a normal exposure mask having only a light transmitting region and a light blocking region, a thin portion is formed by flowing the photosensitive film to a region where the photosensitive film is not present, thereby simplifying manufacturing.

A liquid crystal panel assembly according to an exemplary embodiment of the present invention will be described in detail with reference to the FIGS. 1, 2, and 16.

Figure 16:
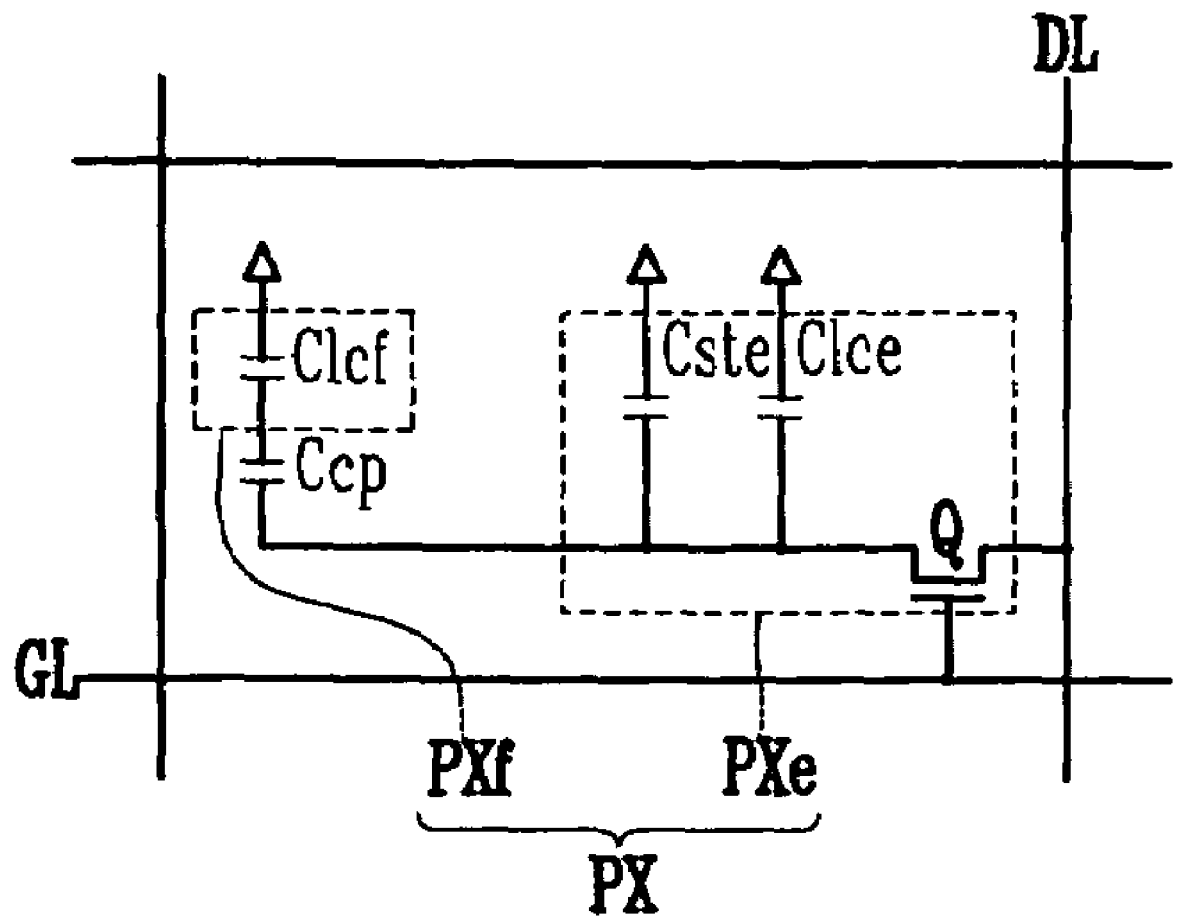
FIG. 16 is an equivalent circuit diagram of a pixel of a liquid crystal panel assembly according to an exemplary embodiment of the present invention.

FIG. 16 is an equivalent circuit diagram of a pixel of a liquid crystal panel assembly according to an exemplary embodiment of the present invention.

Referring to FIG. 16, the liquid crystal panel assembly includes signal lines including a plurality of gate lines GL and a plurality of data lines DL, and a plurality of pixels PX that are connected thereto.

Each pixel PX includes a pair of first and second subpixels PXe and PXf, and a coupling capacitor Ccp that is connected between the two subpixels PXe and PXf.

The first subpixel PXe includes a switching element Q that is connected to the corresponding gate line GL and data line DL and a first liquid crystal capacitor Clce and a storage capacitor Cst that are connected thereto, and the second subpixel PXf includes a second liquid crystal capacitor Clcf that is connected to the coupling capacitor Ccp.

The switching element Q is a three terminal element such as a thin film transistor that is provided in the lower panel 100, and a control terminal thereof is connected to the gate line GL, an input terminal thereof is connected to the data line DL, and an output terminal thereof is connected to the liquid crystal capacitor Clce, the storage capacitor Cste, and the coupling capacitor Ccp.

The switching element Q applies a data voltage from a data line DL to the first liquid crystal capacitor Clce and the coupling capacitor Ccp depending on a gate signal from the gate line GL, and the coupling capacitor Ccp changes a magnitude of the voltage and transfers the voltage to the second liquid crystal capacitor Clcf.

If a common voltage Vcom is applied to the storage capacitor Cste and capacitors Clce, Cste, Clcf, and Ccp and capacitances thereof are designated by the same reference numerals, a voltage Ve that is charged in the first liquid crystal capacitor Clce and a voltage Vf that is charged in the second liquid crystal capacitor Clcf have the following relationship.

$$Vf = Ve \times [Ccp/(Ccp+Clcf)]$$

Because a value of Ccp/(Ccp+Clcf) is smaller than 1, a voltage Vf that is charged in the second liquid crystal capacitor Clcf is always smaller than a voltage Ve that is charged in the first liquid crystal capacitor Clce.

The relationship is realized even though a voltage that is applied to the storage capacitor Cste is not a common voltage Vcom.

An appropriate ratio of a voltage Ve of the first liquid crystal capacitor Clce and a voltage Vf of the second liquid crystal capacitor Clcf can be obtained by adjusting capacitance of the coupling capacitor Ccp.

Having described exemplary embodiments of the present invention, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a substrate; and
    a plurality of pixel electrodes formed on the substrate, one of the pixel electrodes including first and second subpixel electrodes that are separate and distinct from one another,
    wherein each of the first and second subpixel electrodes comprises at least electrode pieces with different inclination directions, and each of said at least two electrode pieces includes a pair of oblique edges facing each other,
    wherein at least one electrode piece of the first subpixel electrode and at least one electrode piece of the second subpixel electrode are adjacently disposed in a horizontal direction, and
    wherein at least one electrode piece of the first subpixel electrode and at least one electrode piece of the second subpixel electrode are adjacently disposed in a vertical direction.

2. The liquid crystal display of claim 1, wherein the first subpixel electrode comprises one right-inclination electrode piece and one left-inclination electrode piece; and
    the second subpixel electrode comprises three right-inclination electrode pieces and three left-inclination electrode pieces.

3. The liquid crystal display of claim 2, wherein a pair of the right-inclination and left inclination electrode pieces are alternately arranged in a vertical direction.

4. The liquid crystal display of claim 1, wherein a height of said at least one electrode piece of the first subpixel electrode is between about 1 to about 2.5 times a height of the electrode piece that is positioned on or under the first subpixel electrode in a plane view.

5. The liquid crystal display of claim 1, wherein an area of the second subpixel electrode is between about 1.1 to about 3 times an area of the first subpixel electrode.

6. The liquid crystal display of claim 1, further comprising a common electrode positioned opposite to the pixel electrodes, the common electrode having a cutout,
    wherein each of said at least two electrode pieces comprises a pair of oblique edges substantially parallel to each other; and
    the cutout comprises an oblique portion crossing the first and second subpixel electrodes, the oblique portion being substantially parallel to an oblique edge of a corresponding electrode piece.

7. The liquid crystal display of claim 1, wherein voltages of the first subpixel electrode and the second subpixel electrode are different from each other.

8. The liquid crystal display of claim 7, wherein the first subpixel electrode and the second subpixel electrode are coupled to each other through capacitive coupling.

9. The liquid crystal display of claim 8, further comprising a thin film transistor connected to the first subpixel electrode;
    a data line connected to the thin film transistor; and
    an organic layer formed between the thin film transistor and the pixel electrodes.

10. The liquid crystal display of claim 9, wherein an adjacent pixel electrode to said one of the pixel electrodes includes third and fourth subpixel electrodes that are separate and distinct from one another, and wherein an area in which the data line is overlapped with the first subpixel electrode and an area in which the data line is overlapped with the fourth subpixel electrode are substantially equal to each other, and the fourth subpixel electrode has the same shape as the second subpixel electrode.

11. The liquid crystal display of claim 1, further comprising a first thin film transistor connected to the first subpixel electrode
    a second thin film transistor connected to the second subpixel electrode;
    a first signal line connected to the first thin film transistor;
    a second signal line connected to the second thin film transistor; and
    a third signal line connected to the first and second thin film transistors and intersecting the first and second signal lines.

12. The liquid crystal display of claim 11, wherein the first and second thin film transistors are turned on depending on a signal from the first and second signal lines, respectively, to transfer a signal from the third signal line.

13. The liquid crystal display of claim 11, wherein the first and second thin film transistors are turned on depending on a signal from the third signal line, to respectively transfer a signal from the first and second signal lines.

14. The liquid crystal display of claim 11, further comprising an organic layer formed between the first and second thin film transistors and the pixel electrodes.

15. The liquid crystal display of claim 11, wherein an adjacent pixel electrode to said one of the pixel electrodes includes third and fourth subpixel electrodes that are separate and distinct from one another, and
wherein when at least one signal line that transfers a data signal among the first to third signal lines is a data line, an area in which the data line is overlapped with the first subpixel electrode and an area in which the data line is overlapped with the fourth subpixel electrode are substantially equal to each other, and the fourth subpixel electrode has the same shape as the second subpixel electrode.

16. The liquid crystal display of claim 2, wherein voltages of the first subpixel electrode and the second subpixel electrode are different from each other.

17. The liquid crystal display of claim 2, further comprising a first thin film transistor connected to the first subpixel electrode;
a second thin film transistor connected to the second subpixel electrode;
a first signal line connected to the first thin film transistor;
a second signal line connected to the second thin film transistor; and
a third signal line connected to the first and second thin film transistors and intersecting the first and second signal lines.

18. The liquid crystal display of claim 17, wherein the first and second thin film transistors are turned on depending on a signal from the first and second signal lines, respectively, to transfer a signal from the third signal line.

19. The liquid crystal display of claim 17, wherein the first and second thin film transistors are turned on depending on a signal from the third signal line, to respectively transfer signals from the first and second signal lines.

20. The liquid crystal display of claim 17, further comprising an organic layer formed between the first and second thin film transistors and the pixel electrodes.

21. The liquid crystal display of claim 17, wherein an adjacent pixel electrode to said one of the pixel electrodes includes third and fourth subpixel electrodes that are separate and distinct from one another, and
wherein when at least one signal line that transfers a data signal among the first to third signal lines is a data line, an area in which the data line is overlapped with the first subpixel electrode and an area in which the data line is overlapped with the fourth subpixel electrode are substantially equal to each other, and the fourth subpixel electrode has the same shape as the second subpixel.

22. The liquid crystal display of claim 1, further comprising a data line traversing said one pixel electrode in a vertical direction and overlapping at least one of a portion of the first subpixel electrode and a portion of the second subpixel electrode.

23. The liquid crystal display of claim 1, wherein each of said at least two electrode pieces has a parallelogram shape.

24. The liquid crystal display of claim 23, wherein the first subpixel electrode comprises one right-inclination parallelogram shaped electrode piece and one left-inclination parallelogram shaped electrode piece; and
the second subpixel electrode comprises three right-inclination parallelogram shaped electrode pieces and three left-inclination parallelogram shaped electrode pieces.

25. A liquid crystal display comprising:
a substrate; and
a plurality of pixel electrodes formed on the substrate, one of the pixel electrodes including first and second subpixel electrodes that are separate and distinct from one another,
wherein each of the first and second subpixel electrodes comprises at least two electrode pieces having different inclination directions, and each of said at least two electrode pieces includes a pair of oblique edges facing each other,
wherein said at least two electrode pieces are alternately arranged in a vertical direction,
wherein at least one electrode piece of the first subpixel electrode and at least one electrode piece of the second subpixel electrode are adjacently disposed in a horizontal direction, and
wherein a number of the electrode pieces of the second subpixel electrode is larger than a number of the electrode pieces of the first subpixel electrode.

26. The liquid crystal display of claim 25, wherein the first subpixel electrode comprises one right-inclination electrode piece and one left-inclination electrode piece; and
the second subpixel electrode comprises two right-inclination electrode pieces and two left-inclination electrode pieces.

27. The liquid crystal display of claim 25, wherein a transverse center line of the first subpixel electrode and a transverse center line of the second subpixel electrode are disposed in a straight line.

28. The liquid crystal display of claim 25, wherein two of the pixel electrodes are adjacently disposed in a vertical direction and have bilateral inversion symmetry; and two of the pixel electrodes are adjacently disposed in a horizontal direction and have a substantially similar shape and transverse center lines disposed in a substantially similar straight line.

29. The liquid crystal display of claim 25, wherein two of the pixel electrodes are adjacently disposed in a vertical direction and have bilateral inversion symmetry; and
pixel electrodes adjacently disposed in a horizontal direction have unmatched transverse center lines and each of the first and second subpixel electrodes of said one pixel electrode adjacently disposed in a horizontal direction have bilateral inversion symmetry to a pixel electrode adjacent to said one pixel electrode in a horizontal direction.

30. The liquid crystal display of claim 26, wherein a height of each of said at least two electrode pieces of the first subpixel electrode and a height of each of said at least two electrode pieces of the second subpixel electrode are substantially the same.

31. The liquid crystal display of claim 25, further comprising data lines each traversing said one of the pixel electrodes in a vertical direction and overlapping at least one of a portion of the first subpixel electrode and a portion of the second subpixel electrode.

32. The liquid crystal display of claim 25, wherein each of said at least two electrode pieces has a parallelogram shape.

33. The liquid crystal display of claim 32, wherein the first subpixel electrode comprises one right-inclination parallelogram shaped electrode piece and one left-inclination parallelogram shaped electrode piece; and
the second subpixel electrode comprises two right-inclination parallelogram shaped electrode pieces and two left-inclination parallelogram shaped electrode pieces.

34. A liquid crystal display comprising:
a substrate; and
a pixel electrode formed on the substrate and comprising first and second subpixel electrodes that are separate and distinct from one another,
wherein each of the first and second subpixel electrodes comprises at least two electrode pieces having different inclination directions,
wherein each of said at least two electrode pieces includes a pair of oblique edges facing each other, and
wherein a first electrode piece of the second subpixel electrode and the first subpixel electrode are adjacently disposed in a vertical direction and a second electrode piece of the second subpixel electrode and the first subpixel electrode are adjacently disposed in a horizontal direction.

35. The liquid crystal display of claim 34, wherein the first subpixel electrode comprises one right-inclination electrode piece and one left-inclination electrode piece; and
each of the first and second electrode pieces comprises one right-inclination electrode piece and one left-inclination electrode piece.

36. The liquid crystal display of claim 35, wherein a height of the first subpixel electrode is between about 1 to about 2.5 times a height of the first electrode piece.

37. The liquid crystal display of claim 34, wherein each of said at least two electrode pieces has a parallelogram shape.

38. The liquid crystal display of claim 37, wherein the first subpixel electrode comprises one right-inclination parallelogram shaped electrode piece and one left-inclination parallelogram shaped electrode piece; and
each of the first and second electrode pieces comprises one right-inclination parallelogram shaped electrode piece and one left-inclination parallelogram shaped electrode piece.

39. A liquid crystal display comprising:
a substrate; and
a pixel electrode formed on the substrate and comprising first and second subpixel electrodes that are separate and distinct from one another,
wherein the first subpixel electrode has a pair of first curved edges that are substantially parallel to each other, each of the first curved edges including at least one bend point, wherein two electrode pieces of the first subpixel electrode meet,
wherein the second subpixel electrode has a pair of second curved edges that are substantially parallel to each other, each of the second curved edges including at least one bend point, wherein two electrode pieces of the second subpixel electrode meet,
wherein a number of the at least one bend point of one of the second curved edges is larger than a number of the at least one bend point of one of the first curved edges,
wherein at least one bend point of the first subpixel electrode and at least one bend point of the second subpixel electrode are adjacently disposed in a horizontal direction.

40. The liquid crystal display of claim 39, wherein the number of the at least one bend point of one of the first curved edges is one and the number of the at least one bend point of one of the second curved edges is three.

41. The liquid crystal display of claim 39, wherein an area of the second subpixel electrode is between 1.1 to about 3 times an area of the first subpixel electrode.

42. The liquid crystal display of claim 39, wherein each of said two electrode pieces of the first and second subpixels has a parallelogram shape.

43. The liquid crystal display of claim 42, wherein the number of the at least one bend point of one of the first curved edges is one and the number of the at least one bend point of one of the second curved edges is three.

* * * * *